(12) United States Patent
Tsujimoto

(10) Patent No.: US 7,361,295 B2
(45) Date of Patent: *Apr. 22, 2008

(54) SOLVENT CASTING PROCESS

(75) Inventor: Tadahiro Tsujimoto, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 11/031,069

(22) Filed: Jan. 10, 2005

(65) Prior Publication Data

US 2005/0110186 A1 May 26, 2005

Related U.S. Application Data

(62) Division of application No. 10/216,856, filed on Aug. 13, 2002.

(51) Int. Cl.
 *B29D 7/01* (2006.01)
 *B29C 55/02* (2006.01)

(52) U.S. Cl. .................... 264/216; 264/217; 264/288.4

(58) Field of Classification Search ................ 264/212, 264/217, 234, 216, 288.4, 290.2
 See application file for complete search history.

(56) References Cited

U.S. PATENT DOCUMENTS 5,152,947 A * 10/1992 Takeda et al. ............... 264/217
6,660,211 B2 * 12/2003 Topolkaraev et al. ....... 264/444

* cited by examiner

*Primary Examiner*—Mathieu D. Vargot
(74) *Attorney, Agent, or Firm*—Sughrue Mion, PLLC

(57) ABSTRACT

A process for solvent casting including, casting a dope from a casting die onto a casting support, drying the cast dope on the casting support to form film, stripping off the film from the casting support, and further drying the film, wherein the dope has a solid matter content of from 17 mass % to 30 mass %, and a mean drying rate between the casting of the dope and the stripping off is more than 300 mass %/minute and not more than 1000 mass %/minute. Also, a process for solvent casting including the steps of casting a dope from a casting die to a casting support, forming the film by drying the dope to some extent, stripping off the film from the casting support and further drying the film while conveying the film with carrying it at both side edges of the film by a tenter under specified conditions.

17 Claims, 2 Drawing Sheets

SOLVENT CASTING PROCESS

This is a divisional of application Ser. No. 10/216,856 filed Aug. 13, 2002.

FIELD OF THE INVENTION

The present invention relates to a solvent casting process for producing cellulose triacetate film, etc. and polarizing plate protective film, optically functional film, or polarizing plate using the film produced by the solvent casting process.

BACKGROUND OF THE INVENTION

Generally, a part of films, such as cellulose acetate, polycarbonate, and cellophane are produced by solvent casting. In the solvent casting process, dope being a polymer solution is cast from a casting die onto a casting support of belt type or drum type, stripped off after being dehumidified to some extent on the casting support, dried while being carried by a tenter machine with being held at both side edges, and further dried while being conveyed over rollers (JP 62-46625A, JP 62-46626A, etc.).

In order to improve productivity in such a solvent casting process, it is necessary to rapidly strip off the dope cast on the casting support. As a result, various technics for stripping off the dope quickly have been developed, such as, a successive multiplayer casting (JP 52-50078A, JP 53-134869A and JP 61-104813A), a casting of a gelation dope on a cooling drum JP 5 17844B and JP 62-64514A), a method of co-casting dopes wherein a gelation dope is cast on the side of the casting support (JP 61-94724A), etc.

In all the foregoing conventional methods, however, it is necessary for the cast film to have self-supporting ability at the time of being stripped off from the casting support. Therefore, particularly great drying rate is required between the casting and the point of being stripped off. Further, it is desirable that the drying of the stripped off film is conveyed by a non-contact system, like a tenter machine. However, it was found that, according to drying conditions, problems occur, such as foaming and degradation of film properties, such as, mechanical strength, transparency, retardation, flatness, etc.

On the other hand, in the case that the cast film containing volatile components in a high concentration is stripped off from a casting support by a tenter machine of a clip type, the film breaks at the portion caught by the clip, and it is difficult to continue earring the film by the tenter. In particular, such a phenomena tends to occur upon loading tension to the film being carried by the tenter in the width direction, or stretching the film in the width direction. Therefore, the high-speed casting and improvement in the manufacturing speed of the film are difficult. In addition, since the film stripped off from the casting support contains volatile components in quality, the film is occasionally foamed at the part caught by a clip tenter heated to a high temperature by drying wind. Then, the foams generated in the film edges are possible to extend to product portion, which become a problem in quality. Moreover, break of the film also occurs occasionally caused by rupture of foamed portions.

In a tenter machine of pin type, many pins penetrate through both side edge portions of the film. When the thickness of this penetration area of the film is thin, the film edge tears by the tension caused by contraction on drying, and it is also possible that the film breaks while releasing the film from the tenter machine. On the other hand, when the thickness of this penetration portion of the film is too thick, the pins are contaminated by the adhesion of the dope not sufficiently dried in the film, which causes a conveyance trouble.

SUMMARY OF THE INVENTION

Solving the foregoing problems, an object of the present invention is to provide a process for solvent casting enabling to produce a film having good quality with stability and with high productivity.

Another object of the present invention is to provide a process for solvent casting enabling to produce a film having good quality at a high speed with stable conveyance and with stable drying especially while the conveyance of the film by the tenter machine in drying after stripping off from the casting support.

The inventors investigated eagerly in order to achieve the objects of the present invention, and they found that a quick stripping off of the film from the casting support is possible by adjusting drying conditions between the casting of the dope onto the casting support and the stripping off the film in a state where the dope solidified in some degree from the casting support. The film is highly clear, optically isotropic and excellent in mechanical strength, in dimensional stability and in durability. Especially, the present invention was completed by finding a desirable drying rate in terms of distance and time between the casting and the stripping off.

They also found that the occurrence of holes, break and foams in the film were caused depending on the thickness of the film, quantity of the volatile components remaining in the film, the temperature of a tenter, atmosphere, drying conditions, etc. and during investigating these optimum conditions, they found a relationship between the thickness of the film at both side edges being carried and the product portion for ensuring stable conveyance and drying. By keeping the relationship, rupture by stress caused by contraction of drying could be eliminated. In addition, foaming problem could be eliminated by adjusting the content of residual volatile components at the portion being carried by the tenter machine in a specific range.

One aspect of the present invention is a solution film forming method for producing a film including the steps of casting a dope from a casting die to a spreading support, forming the film by drying the dope to some extent, stripping off the film from the spreading support and further drying the film arranging the mass fraction of solid content in the dope from 17 mass % or more to 30 mass % or less, and adjusting a mean drying rate between the casting of the dope and the stripping off of the dope from more than 300 mass %/minute to 1000 mass %/minute or less.

Another aspect of the present invention is a solution film forming method for producing a film including the steps of casting a dope from a casting die to a spreading support, forming the film by drying the dope to some extent, stripping off the film from the spreading support and further drying the film, arranging the mass fraction of solid content in the dope from 17 mass % or more to 30 mass % or less, and adjusting a mean drying rate within 15 m from the casting of the dope from more than 300 mass %/minute to 1000 mass %/minute or less.

Another aspect of the present invention is a solution film forming method for producing a film including the steps of casting a dope from a casting die to a spreading support, forming the film by drying the dope to some extent, stripping off the film from the spreading support and further drying the film, arranging the mass fraction of solid content in the dope from 17 mass % or more to 30 mass % or less, and adjusting a mean drying rate between 3 seconds after the casting of the dope and 20 seconds after the casting of the dope from more than 300 mass %/minute to 1000 mass %/minute or lens.

Still another aspect of the present invention is a solution film forming method for producing a film including the steps of casting a dope from a casting die to a spreading support, forming the film by drying the dope to some extent, stripping off the film from the spreading support and further drying the film while conveying the film with carrying it at both lateral edges of the film by a pin tenter, on the assumption that the thickness of the film after drying at both edges in widthwise direction in the area carried by the pin tenter is X μm and that the mean thickness of the product area of the film after drying is T μm, the relationship between X and T satisfies the relationship defined by formula (1), formula (2) or formula (3):

In the case of $T \leq 60$, $$40 \leq X \leq 200 \quad (1)$$

In the case of $60 < T \leq 120$, $$40 + (T-60) \times 0.2 \leq X \leq 300 \quad (2)$$

In the case of $120 < T$, $$52 + (T-120) \times 0.2 \leq X \leq 400 \quad (3)$$

Another aspect of the present invention is

A process for solvent casting which comprises casting a dope from a casting die onto a casting support, drying the cast dope on the casting support form film, stripping off the film from the casting support, and further drying the film while conveying the film with carrying it at both side edges of the film by a pin tenter, wherein residual volatile component content of both side edges of the film being carried by the pin tenter is from 30 mass % to 320 mass % of solid matter at the beginning of being cared by the pin tenter.

Another aspect of the present invention is

A process for solvent casting which comprises casting a dope from a casting die onto a casting support, drying the cast dope on the casting support form film, stripping off the film from the casting support, and further drying the film while conveying the film with carrying it at both side edges of the film by a clip tenter, wherein residual volatile component content of both side edges of the film being carried by the clip tenter is from 1 mass % to 200 mass % of solid matter at the beginning of being carried by the pin tenter.

DETAILED DESCRIPTION OF THE INVENTION

Figure 1:
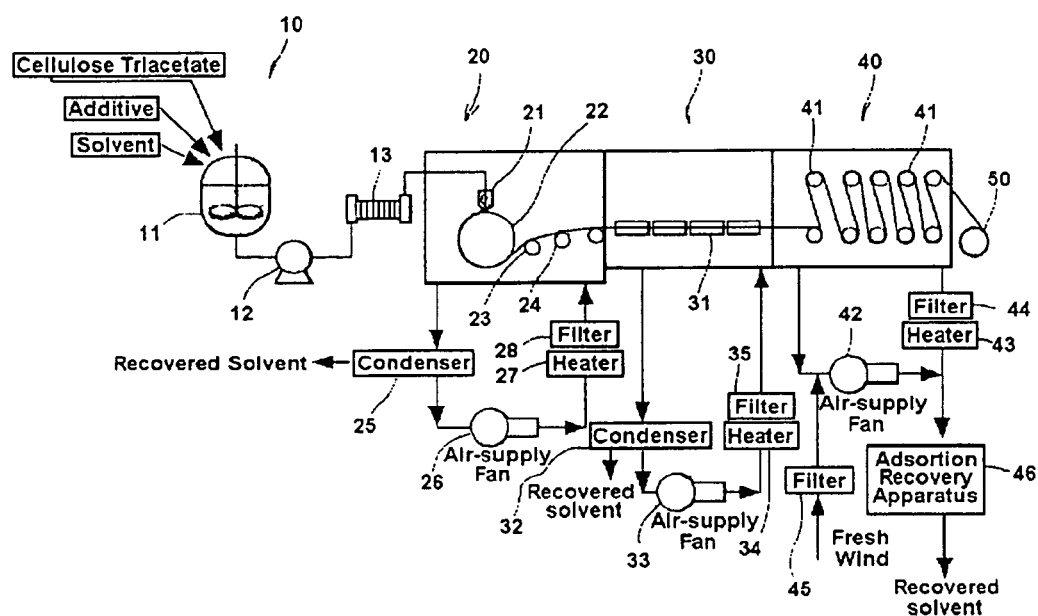
FIG. 1 shows a schematic illustration of a solvent casting apparatus for carrying out the process of the invention.

In an aspect of the invention, a dope having a specific composition is used, i.e. having a solid content of 17 mass % or more and 30 mass % or less, preferably 20 mass % or more and 28 mass % or less, and more preferably 22 mass % or more and 25 mass % or less. Herein, the solid content includes additives, such as plasticizer as well as a polymer, such as cellulose acylate, etc. A solid content of less than 17 mass % is unfavorable, because of increasing drying load of solvent and decreasing productivity. A solid content of exceeding 30 mass % is also unfavorable, because of elevating the viscosity of the dope remarkably which renders feeding and casting of the dope difficult.

The mean drying rate between the casting of the dope and stripping off of the dope exceeds 300 mass %/minute and is 1000 mass %/minute or less, preferably exceeds 400 mass %/minute and is 900 mass %/minute or less, and more preferably exceeds 500 mass %/minute and is 800 mass %/minute or less. When the mean (trying rate of 300 mass %/minute or less, high-speed stripping off of the film becomes impossible thereby causing poor productivity as a result. When the mean drying rate exceeds 1000 mass %/minute, a wind unevenness caused by the drying wind generates and the flatness of the film degrades. The mean drying rate is defined as the value obtained by dividing the variation of solvent content of cast dope with time.

The mean drying rate can be controlled by adjusting the temperature of the drying wind, air rate, the concentration of solvent gas, the surface temperature of the casting support, the temperature of the casting dope, the wet thickness of the casting dope, the solvent composition of the casting dope, etc. appropriately.

In another aspect of the invention, the mean drying rate ranging over 15 m from the casting point of the dope is more than 300 mass %/minute and 1000 mass %/minute or less, preferably more than 400 mass %/minute and 900 mass %/minute or less, and more preferably more than 500 mass %/minute and 800 mass %/minute or less. The reasons of prescribing the upper limit and the lower limit of the mean drying rate are the same as the foregoing reasons. In addition, regarding the mean drying rate in the area of more than 15 m from the casting point, it is not particularly limited but it is preferable to be arranged in a similar range. Herein, the casting point is at the position of die lip.

In still another aspect of the present invention, the mean drying rate ranging from 3 seconds to 20 seconds after the casting point of the dope is more than 300 mass %/minute and 1000 mass %/minute or less, preferably more than 400 mass %/minute and 900 mass %/minute or less, and more preferably more than 500 mass %/minute and 800 mass %/minute or less. The reasons of prescribing the upper limit and the lower limit of the mean drying rate are the same as the foregoing reasons. In addition, in the area of more than 20 seconds after the casting, the mean drying rate is not particularly limited.

It is preferable to cool the casting support in order to promote solidifying of the dope. Specifically, it is desirable to cool the surface temperature of the casting support to 10° C. or less, more desirably to 8° C. or less, and the most desirably to 5° C. or less. The cooling means for the casting support is not limited, and various means conventionally used can be applied.

In addition, the temperature difference between arbitrary two points in the area on the casting support where the dope is spread is preferably 5° C. or less and more preferably 3° C. or less. The temperature difference of exceeding 5° C. is unfavorable, because of inducing non-uniform drying and degrading a stripping off ability.

It is particularly preferable to keep the surface of the casting support at a temperature of 10° C. or less and to keep the foregoing temperature difference between arbitrary two points in the range of 5° C. or less, because of achieving high speed of the stripping off, uniform drying, and uniform properties and flatness of the film.

A preferable oxygen concentration of the drying wind is 10 vol. % or less for drying the dope cast over the casting support, more preferably 5 vol. % or less. Further, a dewpoint of the solvent contained in the drying wind is preferably to be lower than the surface temperature of the casting support by 5° C. or more, more (desirably by 10° C., or more. By applying the foregoing constitution, even a use of inflammable solvent can prevent firing and explosion. In addition, the lowering of the dew point enables to prevent moisture condensation onto the casting support or the casting bead.

The cleanliness (ISO-14644, Part 1) of gas in the drying zone where the casting support is installed is desirable to be ISO class 7 or less, more desirably ISO class 6 or less, and most desirably ISO class 5 or less. By using the clean gas, it is possible to prevent defects on the quality caused by adhesion of foreign matter onto the surface of the casting support or the cast dope. Moreover, the cleanliness of gas in the drying zone is desirable to be higher than the cleanliness of M5.5 as the (class of FED-STD-209E. When the cleanliness of gas in the drying zone is under the foregoing value, it is possible to generate defects on the quality caused by adhesion of foreign matter onto the surface of the casting support or the cast dope. In addition, such cleanliness is similarly required in the drying zone following after the casting support. Therefor, it is preferable that the drying wind over the casting support has been filtered by passing through an air filter having an absolute aperture of 0.5 μm or less once at least. Passing through the air filter enables to ensure easily the foregoing cleanliness.

The dope cast from the casting die on the casting support is dried up to a half-dried state on the casting support. Then, the film solidified to some extent on the casting support is stripped off, and is delivered to a drying section containing a tenter machine, etc. and is completely dried in the drying section. It is desirable to start drying of the film stripped off from the casting support with receiving a tension in a designated range by the tenter. Specifically, it is desirable that drying of the film stripped off from the casting support starts while receiving a tension by the tenter after 0.1-10 seconds from the stripping off. In addition, it is desirable that the film stripped off from the casting support starts being dried while receiving a tension by the tenter in the range of 0.1-10 m as conveyed distance from the point of being stripping off the casting support. By applying the foregoing condition, degradation of flatness caused by contraction of the film during drying can be prevented. Moreover, it is also possible to prevent generation on the defect of the film caused by direct contact of the film containing residual solvent in quantity with carrier rollers at a high temperature.

The film stripped off from the casting support is conveyed to a tenter by means of a stripping roller and carrier rollers. After stripped off from the casting support, it is desirable to convey the film by a cooling roller before preferably until being carried by the tenter and to make the surface temperature of the cooling roller lower than gelation temperature of the dope by 1-20° C. By on the cooling, the occurrence of defect on the film can be prevented caused by direct contact of the film containing residual solvent in quantity with carrier rollers at a high temperature.

In another aspect of the invention, when using a pintenter as the tenter, a dry thickness (X μm) of the both side edges and a mean dry thickness (T μm) of the product portion of the film have the following the relationship:

In the range of $T \leq 60$, $$40 \leq X \leq 200 \tag{1}$$

In the range of $60 < T \leq 120$, $$40+(T-60) \times 0.2 \leq X \leq 300 \tag{2}$$

In the range of $120 < T$, $$52+(T-120) \times 0.2 \leq X \leq 400 \tag{3}$$

The inventors found that the thickness of the film at both side edges carried by the pin tenter has an appropriate thickness range depending on the thickness of the film in the area of product. That is, when the thickness of the film at both side edges carried by the pin tenter is less than 40 μm, the film tends to be tour in the area carried by the pin tenter by the influence of the tension induced by drying, thereby occasionally causing the whole breaking down of the film. When the foregoing thickness exceeds 400 μm, foaming occurs due to considerable amount of solvent remaining in the film. Occasionally, dope adheres to pins, and is solidified. The solidified dope adheres to the film, and induces foreign matter trouble. In order to avoid such a foreign matter trouble, it is necessary installing a dust remover in a contact type, such as a brush, or removing dust using liquid or gas at the detaching part from the pin tenter.

In the range of $T \leq 60$, X of exceeding 200 is unfavorable, because of foaming in the film caused by solvent remaining in the film, and difficulty in detaching the film from the tenter and adhesion of dope to the pins which is transferred to the film and becomes a foreign matter.

In the range of $60 < T \leq 120$, X of less than $40+(T-60) \times 0.2$ is unfavorable, because the film is too thin in the area of being carried tends to be torn easily, particularly on detaching from the tenter by the tension around the pins induced by the contractive force induced by drying. X of exceeding 300 is unfavorable, because of foaming caused by the solvent remaining in the film, and difficulty in detaching the film from the tenter and adhesion of dope to the pins which is transferred to the film and becomes a foreign matter.

In the range of $120 < T$, X of less than $\{52+(T-120) \times 0.2\}$ is unfavorable, because the film is too thin in the area of being carried tends to be torn easily particularly on detaching from the tenter by the tension around the pins induced by the contractive force induced by drying.

In another aspect of the invention, when using a thickness (X μm) of the clip tenter as the tenter, a dry both side edges and a mean dry thickness (T μm) of the product portion of the film have the following the relationship:

In the case of $T \leq 40$, $$5 \leq X \leq T+50 \tag{4}$$

In the case of $40 < T \leq 120$, $$20 \leq X \leq T+100 \tag{5}$$

In the case of $T > 120$, $$60 \leq X \leq T+200 \tag{6}$$

The inventors found that the thickness of the film at both side edges carried by the clip tenter has an appropriate thickness range depending on the thickness of the film in the area of product. That is, when the thickness of the film at both side edges carried by the clip tenter is less than 5 μm, holes are formed in the area where the film contacts with the clips. When the foregoing thickness exceeds (T+200) μm, in the case of a low rigid film containing residual solvent in quantity, the film tends to be torn by the clips, and thereby cannot be conveyed.

In the range of $T \leq 40$, X of exceeding (T+50) is unfavorable because the stretch of the film becomes uneven due to the stress concentration on the area where the thickness of the film is thin depending on the thickness difference between the area carried by the clip tenter and the area of the product.

In the range of $40<T\leq120$, X of less than 20 is unfavorable, because properties and thickness of the film becomes uneven by the reason that the uniform tension is not maintained by the occurrence of slip of the film at the area carried by the clips. X of exceeding (T+100) is unfavorable, because the stretch of the film becomes uneven due to the stress concentration on the area where the thickness of the film is thin depending on the thickness difference between the area carried by the clip tenter and the area of the product.

In the range of $120<T$, X of less than 60 is unfavorable, because properties and thickness of the film becomes uneven by the reason that the uniform tension can not be achieved by the occurrence of slip of the film at the area carried by the clips.

In another aspect of the invention, the residual volatile component content of both side edges of the film being carried by the pin tenter is in the range from 30 mass % to 320 mass %, preferably from 60 mass % to 280 mass %, and more preferably from 80 mass % to 250 mass % of solid matter at the beginning of being carried by the pin tenter. The volatile component content of less than 30 mass %, is unfavorable, because it becomes difficult that the pin of the pin tenter penetrates through the film. When the volatile component content of exceeding 320 mass %, the dope adheres to the pin that penetrated the film, and scatters at detaching of the pin. The scattered dope adheres to the film thereby causing foreign matter troubles. Further, the film adheres to a brush, etc. used for making the pin to penetrate the film upon contact with each other.

In another aspect of the invention the residual volatile component content of both side edges of the film being carried by the clip tenter is in the range from 1 mass % to 200 mass %, preferably from 2 mass % to 150 mass %, and more preferably from 5 mass % to 100 mass % of solid matter at the beginning of being carried by the clip tenter. The volatile component of less than 1 mass % is unfavorable, because the uniform tension cannot be achieved by poor holding power of the clip and slip of the film due to high rigidity of the film and to the reduction of the frictional resistance of the film surface. When the volatile component content exceeds 200 mass %, foaming occurs to degrade the quality of the product portion of the film, and it is also possible that the film breaks at the foamed portion.

In the process for solvent casting of the invention, the cast may be conducted as a monolayer fluid or layers of two or more dopes by a successive extrusion or a coextrusion onto the smooth surface of a band or a drum as a casting support. When plural dopes are cast, the film may be produced by superposing layers of dopes casting the dopes individually from plural of casting outlets provided with intervals in the traveling direction of the casting support. For example, such a method as disclosed in JP 61-158414A, JP 1-122419A, JP 11-198285A, etc. can be applied. In addition, casting the dopes from two casting outlets may produce the film. For example, such a method as disclosed in JP 60-27562B, JP 61-94724A, JP 61-947245A, JP 61-104813A, JP 61-158413A, and JP 61-134933A can be applied. Further, a cellulose acylate film casting method disclosed in JP 56-162617A that wraps the flow of high viscosity dope with low viscosity dope, and extrudes the dope including the high viscosity dope and the low viscosity dope simultaneously may be applied.

Furthermore, the film may be produced by casting the dopes from two casting outlets, namely, striping off the film molded after casting from the first casting outlet on the casting support, casting the dope again from the second casting outlet to the film on the surface where the film contacted with the casting support. This method is described in, for example, JP 44-20235B. Casting dopes are not limited to in particular, but may be the same solution, or even different solutions. In order to give the function to plural of cellulose acylate layers, the dope with the corresponding function may be cast from the respective casting outlet. As for the dope of the present invention, it is possible to cast simultaneously with other functional layer(s) (for example, adhesive layer, dye layer, anti static layer, anti halation layer, UV absorber layer, polarization layer, etc.).

It was required for a monolayer solution to be cast as the dope with high concentration and high viscosity in order to obtain necessary film thickness. In this case, there were many problems due to inferior stability of the dope which generates solid matter, such as lumps trouble and degradation of flatness. As the resolution for these problems, casting plural dopes from the casting outlet enabled to extrude solutions of high viscosity simultaneously on to the casting support, thereby not only made it possible to produce the film with uniform flatness and excellent surface quality, but also raised the production speed of the film with achieving the reduction of drying load by the use of high density dope.

The dope applicable to the invention includes solution of cellulose acylate, polycarbonate, aramid group polymers, norbornane group polymers, etc. Preferable cellulose acylates, are cellulose lower fatty acid esters. The lower fatty acid mean fatty acid of which the number of carbon atoms is 6 or less. Preferable numbers of carbon atoms are 2 (cellulose acetate), 3 (cellulose propionate) or 4 (cellulose butyrate). Cellulose acetate is particularly preferable. A blend of cellulose lower fatty acid esters, such as cellulose acetate propionate or cellulose acetate butyrate, can be used.

Preferable cellulose acetates have a mean acetylation degree of 55.0% or more and less than 62.5%. In a viewpoint of properties of the film, it is more preferable that the mean acetylation degree is 58.0% or more and less than 62.5%. However, by using the cellulose acetate with the mean acetylation degree of 55.0% or more and less than 58.0% (preferably 57.0% or more and less than 58.0%), the film with high retardation in depth direction can be produced.

When using a dope of cellulose acylate solution as the dope, it is preferable that the dope contains at least 10 mass % or more of cellulose acylate, and that the cellulose acylate satisfies the relationship between the substitution ratio A of acyl groups at 6 position and the substitution ratio B of remaining acyl groups satisfies the following formula (7) and formula (8). It is more desirable to be $A \geq 0.8$ in the formula (7).

$$A \geq 0.75 \tag{7}$$

$$2.5 \leq A+B \leq 3.0 \tag{8}$$

By using the cellulose acylate solution as the dope, a film obtained is excellent in solubility in an organic solvent, fluidity, a small amount of foreign matter, high transparency, and optical isotory.

Typical examples of the organic solvent to be used for the dope include hydrocarbons (e.g. benzene, toluene, cyclopentane, cyclohexane, cycloheptane, cyclooctane), halogenated hydrocarbons (e.g. methylene chloride, chlorobenzene), alcohols (e.g. methanol, ethanol, diethylene glycol, n-propanol, isopropanol, n-butanol, 1-butanol, t-butanol, 2-methyl-2-butanol, 2-methoxyethanol, 2-butoxyethanol), ketones (e.g. acetone, methyl ethyl ketone, diethyl ketone, diisobutyl ketone, cyclohexanone, methylcyclohexanone), esters (e.g. methyl acetate, ethyl acetate, propyl acetate, ethyl formate, propyl formate, pentyl formate, butyl acetate, pentyl acetate, 2 ethoxy-ethyl acetate) and ethers (e.g. tetrahydrofuran, methyl cellosolve, diisoprpyl ether, dimethoxymethane, dimethoxyethane, 1,4-dioxane, 1,3-dioxolane, anisole, phenetole), etc.

Preferable solvents are halogenated hydrocarbon having a number of carbon atoms of from 1 to 7, and methylene chloride is the most preferable. From the viewpoint of the solubility of cellulose acylate, peel-off ability from support, mechanical strength of the film, optical properties, etc., it is desirable to mix one or several types of alcohols having a number of carbon atoms of from 1 to 5 with methylene chloride. A preferable content of the alcohol is 2-25 mass % of the whole solvent, and more desirably 5-20 mass %. Specific examples of the alcohol are methanol, ethanol, n-propanol, isopropanol, n-butanol, etc., and methanol, ethanol, n-butanol or a mixture of them is preferably used.

A preferable solvent for the dope contains 50-90 mass % of methyl acetate, 0-40 mass % of acetone and 5-40 mass % of alcohol. The solvent brings easy dissolution, high fluidity on casting, and easy separation from the casting support. Moreover, an obtained film is excellent in transparency, a small amount of foreign matter and optical isotropy.

Various types of additive which meets for application can be added in each preparation process, for example, plasticizer, ultraviolet absorber, degradation inhibitor, fine particles powder, mold lubricant, optical characteristics moderator, fluorine-containing surface active agent. The additive may be at added at any time in the preparation of the polymer solution, or may be added to the prepared polymer solution.

The plasticizer applicable to the invention includes phosphates and carboxylates. Illustrative of the phosphates include triphenylphosphate (TPP), tricresyl phosphate (TCP), cresyldiphenyl phosphate, octyl diphenyl phosphate, diphenyl biphenyl phosphate, trioctylphosphate, tributyl phosphate. Representative carboxylates are phthalic esters and citric acid esters. Examples of phthalic ester include dimethyl phthalate (DMP), diethylphthalate (DEP), dibutyl phthalate (DBP), dioctyl phthalate (DOP), diphenyl phthalate (DPP) and diethylhexyl phthalate (DEHP). Examples of citric acid ester include o-acetyl triethyl citrate (OACTE), o-acetyl tributyl citrate (OACTB), acetyl triethyl citrate, acetyl tributyl citrate. Typical examples of other carboxylates include butyl oleate, methyl acetyl ricinoleate, dibutyl sebacate, trimellitic acid ester, such as trimethyltrimerithate. Illustrative of glycolate esters are triacetin, tributyrin, butylphthalyl-butyl glycolate, ethyl phthalyl ethyl glycolate, carbinyl phthalyl ethyl glycolate, butyl-phthalyl-butyl glycolate.

Preferable plasticizers are triphenylphosphate, biphenyldiphenylphosphate, tricresyl phosphate, cresyldiphenyl phosphate, tributyl phosphate, dim ethyl phthalate, diethylphthalate, dibutyl phthalate, dioctyl phthalate, diethylhexyl phthalate, triacetin, ethyl phthalyl ethyl glycolate, trimethyltrimerithate. In particular, triphenylphosphate biphenyldiphenylphosphate, diethylphthalate, ethyl phthalyl ethyl glycolate, trimethyltrimerithate are preferable.

The foregoing plasticizer may be alone or a combination of two types or more. A preferable blending amount of the plasticizer is 0.1-20 mass % of the cellulose acylate, and more desirably 5-15 mass %. When the blending amount is less than 0.1 mass %, blending effect is insufficient, and when the blending amount exceeds 20 mass %, the plasticizer is possible to bleed out on the film surface.

In addition, as a plasticizer reducing the optical anisotropy, (di)pentaerythritol ester compounds as described in JP Hei 11-124445A, glycerol ester compounds as described in JP 11-246704A, diglycerol ester compounds as described in JP 2000-63560A, citric acid ester compounds as described in JP 11-92574A, substituted phenyl phosphate ester compounds as described in JP 11-90946A, etc. are preferably used in the invention.

Type of the ultraviolet absorber can be selected according to the purpose of use, and applicable UV absorbers are salicylate ester series, benzophenone series, benzotriazole series, benzoate series, cyanoacrylate series, and nickel complex series and, benzophenone series, benzotriazole series and salicylate ester series are desirable. Examples of benzophenone series ultraviolet absorber include 2,4-dihydroxybenzophenone, 2-hydroxy-4-acetoxy benzophenone, 2-hydroxy-4-methoxy benzophenone, 2,2'-di-hydroxy-4-methoxy benzophenone, 2,2'-di-hydroxy-4,4'-methoxy benzophenone, 2-hydroxy-4-n-octoxybenzophenone, 2-hydroxy-4-dodecyloxybenzophenone, 2-hydroxy-4-(2-hydroxy-3-metachryloxy)propoxy benzophenone, etc. Examples of benzotriazole series ultraviolet absorber include 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amyl phenyl)benzotriazole, 2(2'-hydroxy-3',5'-di-tert-butylphenyl)-5-chlorobenzotriazole, 2(2'-hydroxy-5 '-tert-octylphenyl) benzotriazole. Examples of salicylate ester series ultraviolet absorber include phenylsalicylate, p-octylphenylsalicylate, p-tert-butylphenylsalicylate. Among these ultraviolet absorber illustrated above, 2-hydroxy-4-methoxy benzophenone, 2,2'-di-hydroxy-4,4'-methoxy benzophenone, 2(2'-hydroxy-3'-tert-butyl-5'-methylphenyl)-5-chlorobenzotriazole, 2(2'-hydroxy-5'-tert-butylphenyl)benzotriazole, 2(2'-hydroxy-3',5'-di-tert-amyl phenyl)benzotriazole, 2(2'-hydroxy-3',5'-di-tert-butylphenyl)-5-cholorobenzotriazole are particularly preferable.

It is desirable to combine two or more ultraviolet absorbers having different absorption wavelength, because great shielding ability can be obtained in a wide wavelength range.

As the ultraviolet absorber for liquid crystal preferable ones are excellent absorption ability for ultraviolet rays having a wavelength of 370 nm or less in order to prevent degradation of the liquid crystal, and exhibit a little absorption of visible light at wavelength 400 nm or more in terms of displaying ability of the liquid crystal. Typical examples of the ultraviolet absorber for liquid crystal include oxybenzophenone compounds, benzotriazole compounds, salicylate eater compounds, benzophenone compounds, cyanoacrylate compounds, nickel complex compounds, etc. Particularly preferred ultraviolet absorbers are benzotriazole compounds and benzophenone compounds. Among these, benzotriazole compounds are the most preferable, because of little coloration against cellulose ester which is unnecessary.

The UV absorbers are also disclosed in JP 8-239509A, JP 8-29619A, JP 7-11056A, JP 7-11055A, JP 7-11056A, JP 6-148430A, JP 6-118233A, JP 6-107854A, JP 5-271471A, JP 60-235852A, JP 5-194789A, JP 5-1907073A, JP 3-199201A, and JP 2000-204173A.

A desirable blending amount of the ultraviolet absorber is 0.001-5 mass % of cellulose acylate, more desirable 0.01-1 mass %. When the blending amount is less than 0.001 mass %, blending effect is insufficient, and when the blending amount exceeds 5 mass %, the ultraviolet absorber is possible to bleed out on the film surface. The ultraviolet absorber may be added upon dissolving cellulose acylate, or may be added in the cellulose acylate solution after dissolution. It is particularly preferred that an ultraviolet absorber solution is added to the polymer solution just before casting by means of a static mixer or the like, because optical absorption characteristics can be easily adjusted.

The degradation inhibitor prevents cellulose triacetate etc. from its degradation and decomposition. Examples of the degradation inhibitor include butyl amine, hindered amine compounds (JP 8-325537A), guanidine compounds (JP 5-271471A), benzotriazole series UV absorbers (JP 6-235819A), and benzophenone series UV absorbers (JP 6-118233A).

Typical examples of the hindered amine compounds are t-butyl amine, triphenyl amine, tribenzylamine, etc. Illustrative of the guanidine compounds, are shown as the following formula (1a) or (1b).

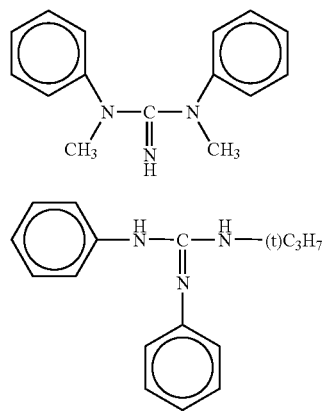

A desirable blending amount of the degradation inhibitor is 0.001-5 mass %, more desirably to be 0.01-1 mass %. When the blending amount is less than 0.001 mass %, blending effect is insufficient, and when the blending amount exceeds 5 mass %, blending effect by the excess amount is small mereby to increase material cost.

The fine particles powders applicable to the invention are silica, kaolin, talc, diatomaccous earth, quartz, calcium carbonate, barium sulfate, titania, alumina, etc., and can be selected therefrom according to the purpose of use. It is preferable to disperse the fine particles powder in a binder solution by are arbitrary means such as high-speed mixer, ball mill, attriter, ultrasonic dispersion machine, before adding it to the polymer solution. As the binder, cellulose acylate is desirable. It is also preferable to disperse it together with the ultraviolet absorber or other additives. Regarding the dispersing solvent, although an arbitrary solvent may be applicable, the solvent preferably has a composition similar to the solvent used in the polymer solution.

A preferred number average particle size of the fine particles powder is 0.01-100 μm, and it is particularly desirable to be 0.1-10 μm. The foregoing dispersions may be added simultaneously in the process for dissolving cellulose acylate, or may be added to the polymer solution in an arbitrary process. However, it is particularly preferable that the dispersion is added to the dope just before casting by means of a static mixer or the like, similarly as the ultraviolet absorber. It is preferable that the content of the fine particles powder is 0.001-5 mass % of the cellulose acylate, and more desirable to be 0.01-1 mass %. When the blending amount is less than 0.001 mass %, blending effect is insufficient. When the blending amount exceeds 5 mass %, it is possible that the surface appearance of the film degrades.

As the mold lubricant, surface-active agent is effective, such as phosphate series, sulfonate series, carboxylate series, nonionic series, cationic series, and ampholytic series surfactants, but is not particularly limited to these. These mold lubricants are disclosed in, for example, JP 61-243837A, etc. A desirable blending amount of addition of the mold lubricant is 0.002-2 mass % of the cellulose acylate, more desirably 0.01-1 mass %. When the blending amount is less than 0.001 mass %, blending effect is insufficient when the blending amount exceeds 2 mass %, it is possible that the mold lubricant deposits or insoluble materials generate.

The nonionic surface-active agent has a polyoxyethylene, polyoxypropylene, polyoxybutylene, polyglycidyl or sorbiton, as nonionic hydroplilic group. Examples of the nonionic surface active agent include polyoxyethylene alkylether, polyoxyethylene alkyl phenyl ether, polyoxyethylene-polyoxypropyleneglycol, polyol aliphatic acid partial ester, polyoxyethylene polyol aliphatic acid partial ester, polyoxyethylene fatty acid ester, polyglycerol fatty acid ester, aliphatic acid diethanoleamide, triethanolamine aliphatic acid partial ester.

The anionic surface active agent is carboxylate, sulfate, sulfonate, phosphate or the like. Typical examples of the anionic surface active agent are fatty acid salt, alkylbenzenesulfone acid salt, alkylnaphthalenesulfone acid salt, alkylsulfone acid salt, α-olefinsulfone acid salt, dialkylsulfosuccinic acid salt, α-sulfonated fatty acid salt, N-methyl-N oleyl taurine, petroleum sulfonc acid salt, alkyl sulfate salt, sulfonated oil, polyoxyethylene alkyl ether sulfate, polyoxyethylene alkyl phenyl ether sulfate salt, polyoxyethylene stylenated phenyl ether sulfate salt, alkylphosphate salt, polyoxyethylene alkyl ether phosphate, naphthalenesulfonic acid salt formaldehyde condensate, etc.

The cationic surface active agent is an amine salt, quaternary ammonium salt, pyridinium salt or the like. Examples of the cationic surface active agent are primary to tertiary fatty amine salts, quaternary ammonium salts (tetraalkylammonium salt, trialkyl benzyl ammonium salt, alkyl pyridinium salt, alkyl imidazolium salt).

The amplrolytic surface active agent is carboxybetaine, sulfobetaine or the like, and examples of the ampholytic surface-active agent are N-trialkyl-N-carboxymethyl ammonium betaine, N-trialkyl-N-sulfoalkylene ammonium betaine, etc.

By adding the fluorine-containing surface-active agent, antistatic effect can be exhibited. A desirable blending amount of the fluorine-containing surface-active agent is 0.001-2 mass % of the cellulose acylate, more desirably 0.01-0.5 mass %. When the blending amount is less than 0.002 mass %, blending effect is insufficient. When the blending amount exceeds 2 mass %, it is possible that the mold lubricant deposits or insoluble materials generate.

In the invention, a retardation activator (optical characteristics moderator) may be added to the dope. By adding the retardation activator, optical anisotropy of the film can be controlled. Preferable retardation activators are aromatic compounds having at least two aromatic rings, in order to adjust the retardation of the cellulose acylate film. As for the aromatic compound, it is applied in the range of 0.01-20 mass parts, preferably 0.05-15 mass parts, more preferably 0.1-10 mass parts, for 100 mass parts of the cellulose acylate. Two or more types of the aromatic compound are jointly applicable. The aromatic ring in the aromatic compound includes aromatic heterocyclic ring in addition to aromatic hydrocarbon ring.

Particularly preferable aromatic hydrocarbon ring in 6 membered-ring (i.e. benzene ring). The aromatic heterocyclic ring is generally unsaturated hetercyclic ring. Preferable aromatic heterocyclic rings are five, six or seven-membered ring, more preferablg five or six membered-ring. The aromatic heterocyclic ring generally has the maximum number of double bonds. As heteroatoms, nitrogen atom, oxygen atom, and sulfur atom are preferable, and the nitrogen atom is particularly preferable. Examples of aromatic heterocyclic ring are furan ring, thiophene ring, pyrrole ring, oxazole ring, isoxazole ring, thiazole ring, isothiazole ring, imidazole ring, pyrazole ring, furazan ring, triazole ring, pyran ring, pyridine ring, pyridazine ring, pyrimidine ring, pyrazine ring and 1,3,5-triazine ring.

A preferable molecular weight of the retardation activator is 300-800. A preferable boiling point of the retardation activator is 260° C. or more. The boiling point can be measured by means of a commercial measuring apparatus (for example, TG/DTA100, made by Seiko Electronic Instruments Inc.).

In the invention, a colorant may be added to the dope. By adding the colorant, light piping phenomenon can be prevented when the dope is applied to the support for a light-sensitive material, etc. A desirable blending amount of the colorant is 10-1000 ppm of the mass of cellulose acylate, more desirably 50-500 ppm.

To the dope of the invention, other additives may be added, such as heat stabilizer such as salt of alkaline earth metal, e.g. calcium or magnesium, antistaitic agent, fire retardant, lubricant, etc., if necessary.

In preparing the dope used in the present invention, inside of the vessel for preparation may be impregnated with inert gas, such as nitrogen gas. The viscosity of the cellulose triacetate solution just before casting may be in the range of being able to be cast, preferably in the range of from 10 ps·s to 2000 ps·s, particularly from 30 ps·s to 400 ps·s.

The dope used for the invention is prepared in accordance with cooling disolution process or high temperature disolution process. The cooling disolution process is explained below. At first, cellulose acetate is added slowly in to an organic solvent with stirring at a temperature adjacent to the room temperature (from −10° C. to 40° C.). The addition order is not particularly limited, when plural solvents are used. For example, cellulose acetate is added to a main solvent, and thereafter another solvent (e.g. gelation solvent such as alcohol) is added. To the contrary, cellulose acetate is moistened with the gelation solvent, and the main solvent is added to the cellulose acetate. The latter is effective for the prevention of uneven dissolution. It is desirable that the quantity of cellulose acetate is made 10-40 mass % of this mixture, more preferably 10-30 mass %. Further, arbitrary additives described above may be added previously in the mixture.

Then, the mixture is cooled to in the range of from −100° C. to −10° C. (preferably from −80° C. to −10° C., more preferably from −50° C. to −20° C., and most preferably from −50° C. to −30° C.). The cooling can be carried out, for example, in a dry ice-methanol bath (−75° C.) or in a cooled diethylene glycol solution (−30° C. to −20° C.). During the cooling, the mixture of the cellulose acetate and the organic solvent solidifies. Although cooling velocity is not particularly limited, however, in the case of batch wise operation, an efficient dissolution tank is desirable for reaching the predetermined cooling temperature, because, the cooling efficiency degrades with raising the viscosity of the cellulose acetate solution.

The dope of the invention can be prepared by charging in a cooling apparatus previously cooled to a predetermined cooling temperature for a short time after swelling. The faster the cooling velocity, the better it is, but the theoretical upper limit is 10000° C./second, the technical upper limit is 1000° C./second and the practical upper limit is 100° C./second. The cooling velocity is defined as the value obtained dividing the difference between the temperature at the start of cooling and the final cooling temperature by the time from the start of cooling till reaching to the final cooling temperature. Then, by warming the mixture in the range from 0° C. to 200° C. (preferably from 0° C. to 150° C., more preferably from 0° C. to 120° C., most preferably from 0° C. to 50° C.), the solution in which the cellulose acetate is fluidized in the organic solvent is prepared. The temperature elevation may be conducted by putting the mixture in room temperature, or by warming in a warm bath. While warping, although it is possible that the pressure will become 0.3-30 MPa, it is not a problem in particular. The warming is preferably carried out in a time as short as possible, and a short time heating of 0.5-60 minutes, particularly of 0.5-2 minutes is recommended.

In addition, manipulation of cooling and warming may be repeated when the dissolution is not enough. Whether the dissolution is enough or not enough can be found by the visual observation of the solution. It is desirable to use a closed vessel in cooling dissolution approach in order to avoid moisture contamination caused by moisture condensation in cooling. Moreover, the dissolution time can be shortened by pressurizing an cooling and depressurizing on warming respectively, in cooling and warming manipulation. It is desirable to use a pressure resistant vessel in order to execute pressuring and depressuring.

Preparation of the cellulose acetate solution by a high temperature disolution process is explained below. At first, cellulose acetate is added slowly in an organic solvent with stirring at a temperature adjacent to the room temperature (from −10° C. to 40° C.). The addition order is not particularly limited, when plural solvents are used. For example, cellulose acetate is added to a main solvent, and thereafter another solvent (e.g. gelation solvent such as alcohol) is added. To the contrary, cellulose acetate is moistened with the gelation solvent, and the main solvent is added to the cellulose acetate. The latter is effective for the prevention of uneven dissolution. It is desirable to make previously the cellulose acetate solution of the invention swell by adding cellulose acetate in a organic solvent mixture containing various solvents. In this case, the cellulose acetate may be added slowly in any of the solvents with stirring at the temperature of from −10° C. to 40° C. Otherwise, a homogeneous swollen solution may be prepared by swelling previously cellulose acetate with a specific solvent and then mixing another solvent to be combined. Besides, cellulose acetate is previously swollen with two or more types of solvent, and then remaining solvents is added.

In the invention, a preferable dissolution concentration of cellulose acetate is 30 mass % or less according to the high pressure high temperature dissolution process in a mixed solvent system of methyl acetate and ketone solvent having a number of carbon atoms of 4-12. On the other hand, from the point of drying efficiency on the film forming, a higher concentration is more preferable. As a result, is desirable that the quantity of cellulose acetate is 10-30 mass % in the final dope. In the organic solvent composition of the invention, it is preferable to prepare a cellulose triacetate solution in a high concentration, but it may be practical to prepare the solution of arbitrary concentration in the above range. When the concentration is too high, the viscosity of the solution becomes too great, and thereby, it is possible to make a film difficult. Accordingly, a preferred concentration of cellulose acetate in the solution is in the range of from 15 mass % to 30 mass %, more preferably in the range of from 17 mass % to 25 mass %.

Then, the mixed organic solvent solution is heated to 70-240° C. (preferably 80-220° C., more preferably 100-200° C., and most preferably 100-190° C.) under pressuriging of from 0.2 MPa to 30 MPa. The heating may be conducted, for example, either by using high-pressure steam or electric heating. For pressurizing, a pressure vessel and pressure-resistant pipeline is necessary. The pressure vessel and the pipeline may be made of iron, stainless steel or other metal but not particularly limited there to. Since the heated solution cannot be applied as is, it is necessary to cool it to the lowest boiling point or lower than that among the employed solvents. In general, it is cooled to −10 to 50° C., and returns to normal pressure conditions. The cooling may be achieved by allowing the holding high pressure high temperature vessel and pipeline containing cellulose acetate solution to stand at room temperature. The cooling may be preferably achieved by cooling the apparatus with the use of coolant such as cooling water. In addition, manipulation of warming and cooling may be repeated in order to fasten the dissolution. Whether the dissolution is enough or not enough can be found by the visual observation of the solution. In the high pressure high temperature dissolution process, a closed vessel is employed in order to avoid vaporization of the solvent. The dissolution time can further be shortened by pressurizing and depressurizing in the swelling process.

The dope being the polymer solution is cast from a casting die onto a casting support in belt type or drum type, stripped off after evaporating solvents to some extent on the casting support, and is dried while being carried by a tenter machine with being held at both side edges, or if necessary, is further dried while being conveyed over rollers.

In the invention, it is preferable that the temperature of the tenter is lower than the boiling point of the residual solvent in the film upon carrying the film. By rendering the temperature lower than the boiling point, foaming does not occur at the carried portion of the film, and rupture of the film can also be prevented during conveying. Specifically, a preferable temperature of the tenter is lower than the boiling point of the residual solvent by 2-50° C. When the temperature of the tenter is higher than (boiling point −2° C.) of the residual solvent, foaming of the solvent cannot be prevented entirely. When the temperature is lower than (boiling point −50° C.) of the residual solvent, ambient solvent gas and moisture are condensed on the tenter to degrade the function of the tenter, or to induse foreign matter trouble caused by scattering to adhere to the film.

By using a pin tenter machine, a film with excellent flatness can be obtained by drying the film containing volatile solvents in quantity without direct contact with rollers and giving necessary tension, as disclosed in JP 62-046625B and JP 62-046626B. Either only one step pin tenter machine or multistep pin tenter machine can be employed for drying. However, there was a problem of foaming in the film carried by the pin tenter machine caused by the elevation of temperature of the pin tenter by drying wind, and it disturbs conveying of the film. By adjusting the temperature of the pin tenter in the foregoing range these problems can be solved.

In order to keep the temperature of the tenter machine below the boiling point of residual solvent by 2-50° C., it is preferable to coot the tenter compulsorily by a cooling means. Although the cooling means is not particularly limited, it is desirable to use at least one selected from blowing of cooling gas, spraying of a volatile solution, cooling by cooled fluid directly, and the use of Peltier element or piezo element, and in particular, flowing of cooling gas is preferable, because of being simple and effective. For example, cooling may be conducted during conveying the film by a tenter chain while drying in the drying zone. It is also possible that cooling is conducted after detaching the film and before the start to carry the film again. In the case of the former, it is effective to install a drying wind shielding device which separates temperature conditions between the area being carried by the tenter and the area being dried, and prevents temperature elevation of the tenter by drying.

Further, cooling may be conducted either locally the carrier part of the tenter machine while drying or between detaching of the film and starting to carry the film again. As for the cooling while drying, cooling efficiency degrades because the drying wind influences the cooling. To the contrary, the cooling between detaching of the film and starting to carry the film again is efficient because there is no direct influence on the cooling. In order to cool more effectively, the distance between detaching of the film and starting to carry the film again is preferably 10%-60% of the total length of the tenter, more preferably 20-50%, and most preferably 30-50%. When the distance is less than 10% of the total length of the tenter, the cooling is not enough. When it exceeds 60%, the drying becomes not enough.

On carrying the film stripped off from the casting support by the pin tenter, it is necessary that the pin penetrates through the film to some extent. For the purpose, blowing gas or pushing by a roller or a brush having rotating function is effective. On this occasion, it is desirable that the temperature of the gas or the brush at the portion of contact to carry the film lower than the boiling point of the residual solvent by 2-50° C., and higher than the dew-point of atmospheric gas by 2-50° C. When the temperature exceeds the temperature lower than the boiling point of the residual solvent by 2° C., foaming of the solvent cannot be prevented entirely and conveying of the film is disturbed by the adhesion of the film to the brush. When the temperature of the tenter machine is lower than the temperature lower than the boiling point of residual solvent by 50° C., the surrounding solvent gas and moisture condense or solidify on the tenter machine which degrades the function of the tenter machine and induces foreign matter trouble by adhering the solidified matter on the film. Further, it is desirable that the temperature is lower than the gelation temperature of the film by 2-50° C. The foregoing description is applicable in the case of the clip tenter.

Furthermore, it is desirable that the temperature of both side edges being carried by the tenter is preferable to be lower than the boiling point of the residual solvent by 2-50° C., and higher than the dew-point of atmospheric gas by 2-50° C. In the case of drying the film while conveying by the tenter machine, drying with receiving tension in the width direction is preferable for obtaining excellent flatness. It is also effective to stretch at temperature of glass transition point (hereinafter referred to as "Tg") or higher than that. In this way, generation of crepe like irregularity appearing in casting direction during drying or contraction can be inhibited.

As the draw ratio, 1-30% is preferable. A preferable drawing velocity is 1%/minute to 100%/minute. The holding time after drawing is preferably 1-180 seconds. It is preferable that tension in the width direction is 1960 N/m (200 kg/m) or less given to the film with being carried by the tenter. When the tension exceeds 1960 N/m (200 kg/m), breaking of the film occurs, or the film falls out from the clip. Moreover, unevenness occurs in stretching between the portion carried by the clip and the portion not carried by the clip, and unevenness in stretching also occurs caused by minute temperature distribution and thickness distribution.

It is also effective to use a simultaneous biaxial stretching tenter for inhibiting the generation of similar irregularity in the width direction. It is also effective against films almost not containing residual solvents to be stretched in the width direction and the casting (longitudinal) direction at a temperature of Tg or higher than that, for the purpose of improving flatness. The biaxial stretching can be carried out by installing two or more tenter machines in the process, or it is also possible to use another tenter for stretching against once wound film. A film with much residual solvent content just after being stripped off from the casting support, frequently shows an non-uniform contraction behavior by the influence of the great solvent quantity difference between the upper surface and the lower surface. Accordingly, it is desirable not to contact the lower surface facing the casting support, in particular, with rollers, etc. just after being stripped off from the casting support. Moreover, it is desirable not to contact even the upper surface being anti-support side with rollers, etc. just after being stripped off from the casting support. In order to achieve excellent flatness and surface properties, the total contact time of the lower surface from being stripped off from the casting support to start being conveyed by the tenter machine without contact is desirable to be within 5 seconds. The contact time is more desirably within 3 seconds, and it is the most desirable for the lower surface to be carried by the tenter machine without any contact. Similarly, the total contact time of the upper surface from being stripped off from the casting support to start being conveyed by the tenter machine without contact is desirable to be within 10 seconds. The contact time is more desirably within 5 seconds, and most desirably within 2 seconds.

After having stripped off from the casting support, in the case of conveying a film with keeping the lower surface without contact with rollers, etc., the film is conveyed along the rollers disposed in arch-shaped only with contact to the upper surface of anti-support side. In this case, the wrap angle against the roller is preferable to be 0.5 degrees or more. Each roller for conveying the film to the tenter machine is preferably provided with a mechanism for controlling draw ratio. It is preferable for the draw ratio between the stripping off division and the tenter machine to be 0-30%, more preferable to be 0-20%, and the most preferable to be 0-10%.

In addition, it is desirable that the roller can be cooled or heated by means of streaming water inside, air blowing or induction heating. Further, as a counter measure against the adhesion of blemish to the roller, it is effective to provide a function forming temperature distribution in a width direction of the roller.

The surface treatment of the roller for conveying the film to the tenter machine may be flat, matte or dimple. In order to prevent generation of wrinkles on the film, the surface treatment may be changed in the central portion and side edge portions respectively. For example, it is desirable to make the edge portion where the film is carried dimple finish with a flat rate of 50% and to make the central portion flat finish.

Although the drying time of the film while carried by the tenter is not particularly limited, a preferable drying time is 20 seconds or more, more preferable one minute or more, and most preferable two minutes or more.

It is desirable that the evaporation of the solvent from the film being carried by the tenter machine is 50-99% of the total evaporation of the solvent from the film between being stripped off from the casting support and being wound up after drying. When the evaporation is less than 50%, the drying becomes insufficient. As a result, the quality of the film degrades the effect of improving the flatness by drying with tension while carrying by the tenter. The evaporation exceeding 99% is also unfavorable in the space and cost, because the length of the tenter zone becomes remarkably long. A quantity of drying solvent while conveying with the tenter is not particularly limited, and includes the case of the evaporation of only a little quantity. In the case that the film is carried by the pintenter and dried immediately after stripped off from the casting support, the change of the content of residual solvent in the tenter zone is preferably 20-320 mass % of solid matter. The change is more preferable to be 60-280 mass %, and most preferable to be 100-260 mass %. In the case of clip tenter, the change of residual solvent of the film in the tenter zone is preferable 5-200 mass %, more preferably 10-150 mass %, and most preferably 20-120 mass %.

The film is heated by hot wind, microwave, or conduction heating while being conveyed by the tenter machine. The variation of the temperature of the film caused by heating during carrying by the tenter until detached from the tenter, is preferably 10-180° C., is more preferably 20-150° C., and most preferably to be 30-130° C. In the case that the evaporation of solvent is litte, the film may be heated to Tg of the film or higher. However, in the case of including substantial evaporation of solvent, it is desirable to conduct the drying at a drying temperature of apparent Tg of the film +20° C. or less.

In any heating method, it is preferable that the temperature distribution in the width (cross) direction of the product portion located inside the side edge portions of the film carried by the tenter is 10° C. or less. A more preferable temperature distribution is 5° C. or less, more preferably 3° C. or less, and most preferably 2° C. or less. When the temperature distribution exceeds 10° C., it becomes difficult to obtain uniform surface conditions. In order to satisfy the foregoing requirement, it is preferable that distribution of overall heat transfer coefficient in the width direction of the film is within 10% by hot wind, infrared ray, microwave, conduction, heating etc. The distribution is desirably within 5%, more desirably within 3%, and most desirably within 2%. In order to achieve the foregoing requirement, for example, in the case of hot wind, a means for uniforming blowing wind velocity from a slit can be employed, such as a two-dimensional nozzle. Otherwise, even in the case of employing a conventional slit or a perforated plate, etc., it is possible to make the temperature distribution in the width direction of the film substantially uniform by equipping plural temperature control mechanisms in the width direction. The overall coefficient of heat transfer in the film by the drying wild is preferably 5-300 kcal/m²·hr·° C. When the coefficient is less than 5 kcal/m²·hr·° C., effective heating in a short time cannot be realized. When the coefficient exceeds 300 kcal/m²·hr·° C., foaming or occasionally a crystallization in the film occurs which is unfavorable for the quality of the film. It is preferable that overall coefficient of heat transfer in tenter cooling by the cooling air is 10-300 kcal/m$^2$·hr·° C. When the coefficient is less than 10 kcal/m$^2$·hr·° C., effective heating in a short time cannot be realized. When the coefficient exceeds 300 kcal/m$^2$·hr·° C., properties of the film carried by the tenter varies to induce tearing or film dust or detaching it separation from the tenter machine.

In the case of heat radiation, it is possible to make the temperature distribution in the width direction of the film substantially uniform by adjusting output of the heater in the width direction. The mechanism for making the temperature distribution in the width direction of the film uniform is preferably controlled with feedback by means of detecting temperature distribution in the width direction of the film. As a temperature detecting means, an infrared radiation-thermometer of non-contact type is desirable as well as a thermometer of contact type.

It is preferable that an air velocity distribution on the film surface in the width direction of product portion inside the side edge portions of the film carried by the tenter is 10% or less, more desirably 5% or less, most desirably 3% or less. When air velocity distribution in the width direction exceeds 10%, it is difficult to obtain uniform surface conditions.

Oxygen concentration of the drying zone using the tenter is 10% or less. It is possible to recover solvent gas generated in the drying zone by condensation, and the recovered solvent can be recycled after reducing the water content of the solvent to 2 mass % or less. It is also possible to slit side edge portions of the film which were carried by the tenter continuously after detached from the tenter machine, and the slit side edge portions can be recycled as a part of material. Particularly, it is preferable that the side edge portions of the film, which were carried by the tenter, are slit within 3 minutes after detached from the tenter machine, and that the residual solvent quantity of the side edge portions of the film is 60 mass % or less. In the case that the residual solvent quantity of the side edge portions of the film exceeds 60 mass %, the position of being slit fluctuates or inadequate slitting generates caused by poor rigidity of the film during slitting by a stationary blade, rotary blade or vibrating blade. Further, during conveying the slit side edge portions of the film with more than 60 weight % of the residual solvent quantity by blowing wind, the slit side edge portions adheres to a blowing duct.

The film produced by the process for solvent casting of the present invention is appropriate for polarizing plate protective film, optical functionality film (optical compensation sheet, antireflection film, brightness improvement membrane, etc.), etc. Polarizing plate protective film, optical functionality film, etc. are used in a liquid crystal display device, and the liquid crystal display device comprises a liquid crystal cell, a polarizing plate and an optical compensation sheet (phase contrast plate). In a transmission type liquid crystal display device, two sheets of polarizing plate are attached to both surfaces of the liquid crystal cell, and one or two optical compensation sheets are interposed between the liquid crystal cell and the polarizing plate. In a reflecting type liquid crystal display device, a reflecting plate, a liquid crystal cell, one optical compensation sheets and one sheet of polarizing plate are assembled in this order.

The liquid crystal cell comprises cylinder-shaped molecules exhibiting mesomorphism, two pieces of substrate for sealing enclosing it and an electrode pole layer for applying voltage to the cylinder-shaped molecules exhibiting mesomorphism. As for the liquid crystal cell, various display modes are disclosed depending on the difference of molecular orientation of the cylinder-shaped molecules exhibiting mesomorphism, such as TN (Twisted Nematic), IPS (In-Plane Switching), FLC (Ferroelectric Liquid Crystal), OCB (Optically Compensatory Bend), STN (Supper Twisted Nematic), and VA (Vertically Aligned) for the transmission type liquid crystal cell, and HAN (Hybrid Aligned Nematic) for the reflecting type liquid crystal cell.

A polarizing plate generally comprising a polarizing film and a transparent polarizing plate protective film. The polarizing film is, in general, prepared by impregnating aqueous solution of iodine or dichromatic dye in polyvinyl alcohol, and then uniaxialy stretching this film. The polarizing plate is constructed by the polarizing film and two sheets of transparent polarizing plate protective film laminated on both surfaces of the polarizing film. The optical compensation sheet is used in various liquid crystal display devices in order to extinguish pictorial image coloring or to expand viewing angle. As the optical compensation sheet, a stretched birefringence film was employed conventionally.

Instead of the optical compensation sheet comprising the stretched birefringence film, an optical compensation sheet having an optical anisotropy layer comprising molecules exhibiting mesomorphism (in particular, molecules exhibiting discotheque mesomorphism) on a transparent support is proposed. The optical anisotropy layer is formed by orientating molecules of mesomorphism, and then, immobilizing the oriented state. Generally, the immobilization of the oriented state is achieved by polymerization of molecules exhibiting mesomorphism having a polymerizable group. The molecule exhibiting mesomorphism has a great birefringence ability, and has various orientation configurations. By using the molecule exhibiting mesomorphism, it became possible to form new optical properties which could not be obtained by conventional stretched films exhibiting birefringence.

Optical properties of the optical compensation sheet are determined depending on the optical properties of the liquid crystal cell, especially, on the foregoing difference of the display mode. By the use of the molecule exhibiting mesomorphism, particularly, by the use of the molecule exhibiting discotheque mesomorphism, it is possible to produce the optical compensation sheets having various optical properties corresponding to various display modes of liquid crystal cell.

Its to the optical compensation sheet using of the molecule exhibiting discotheque mesomorphism, various optical compensation sheets have been proposed corresponding to various display modes. For example, the optical compensation sheets for liquid crystal cell of TN mode are disclosed in JP 6-214116A, U.S. Pat. No. 5,583,679, U.S. Pat. No. 5,646,703, and DE 3911620A1. The optical compensation sheets for liquid crystal cell of IPS mode or FLC mode are disclosed in JP 10-54982A. The optical compensation sheets for liquid crystal cell of OCB mode or HAN mode are disclosed in U.S. Pat. No. 5,805,253 and WO 96/37804. The optical compensation sheets for liquid crystal cell of STN mode are disclosed in JP 9-26572A. Moreover, the optical compensation sheets for liquid crystal cell of VA mode are disclosed in Japanese Patent. No. 2866372.

In an elliptical polarizing plate produced by laminating an optical compensation sheet using molecules exhibiting mesomorphism with the polarizing plate, the optical compensation sheet is enabled to function as a polarizing plate protective film on one surface of polarizer. Such an elliptical polarization plate has a layer structure comprising a transparent protective film, a polarizing film, a transparent support and an optical anisotropy layer formed by the molecules exhibiting mesomorphism in this order. The liquid crystal display device is characterized by being thin and lightweight. The device can be rendered thinner and lighter in weight by reducing one layer by exhibiting functions of two layers by one layer, and thereby, the possibility of troubles in its production can be decreased due to the elimination of one assembling process of the component layer being unnecessary. The integrated elliptical polarizing plate wherein the transparent support in optical compensation sheet containing molecules exhibiting mesomorphism is commonly used with a protective film on one surface of the polarizing plate, are disclosed in JP 7-191217A, JP 8-21996A and JP 8-94838A.

When producing an optical compensation sheet having an oriented film and an optical anisotropy layer, wherein orientation of molecules exhibiting mesomorphism is immobilized, on a transparent support, adhesiveness between the transparent support (usually, cellulose acetate film) and the oriented film (usually, polyvinyl alcohol) is required. Usually, affinity between the cellulose acetate film and polyvinyl alcohol is inferior, and there is a problem that peeling apart or crack easily occurs. In order to obtain good adhesion between the cellulose acetate film and the oriented film, a gelatin-subbing layer is applied on the surface of the cellulose acetate film.

A preferable thickness of the transparent support is 20-500 μm, and more preferably 40-200 μm.

In the case that the transparent support is preferably to have optical isotropy, usual cellulose ester film can be employed. In the case that the transparent support is required to have optical anisotropy, it is preferable to employ cellulose ester film with high retardation. The retardation in the face of the cellulose ester film (Re) can be adjusted (at high value) by stretching the cellulose ester film. The retardation in the depth direction of the cellulose ester film (Rth) can be adjusted (at high value) by (1) the use of retardation activator, (2) adjusting mean acetylation degree (degree of acetylation) or (3) film production by cooling dissolution process. Thereby, the cellulose ester film conventionally regarded as having optical isotropy became able to be employed as an optical anisotropy transparent support having optical compensation function.

The retardation value in depth direction of an optical anisotropy support (Rth) is preferably 60-1000 nm. The retardation value in the face (Re) is preferably in the range from −50 nm to 50 nm, and more preferably from −20 nm to 20 nm.

The retardation value in depth direction is defined as the value obtained by multiplying the birefringence in depth direction with the thickness of the film. The retardation value in the face is defined as the value obtained by multiplying the birefringence in the face with the thickness of the film. The actual retardation value is obtained in such a way that arranging the incident direction of measuring beam vertical to the film surface, conducting the extrapolation using both the measured result of retardation in the face being based on a lagging axis and the measured result of retardation in the incident direction slant as against the vertical direction as opposed to the film surface. The measurement may be conducted by means of ellipsometer (for example, M-150 manufactured by Japan spectral Co., Ltd.). The measuring wavelength employed is, 632.8 nm (He—Ne laser beam).

The retardation value (Rth) in depth direction and the retardation value (Re) in the face are calculated by the following formula (9) and (10) respectively.

$$Rth = \{(nx+ny)/2 - nz\} \times d \qquad \text{Formula (9):}$$

$$Re = (nx-ny) \times d \qquad \text{Formula (10):}$$

In the formula, nx is refractive index in the x direction on film face, and ny is the refractive index in the y direction on film face, and nz is the refractive index in the direction which is perpendicular to film face and d is the thickness of film (nm).

An apparatus for carrying out the process for solvent casting according to the invention will be explained with reference to the drawing.

FIG. 1 shows at schematic illustration of apparatus for producing film by the solvent casting method. In FIG. 1, numerical symbol 10 shows dope preparation part, numerical symbol 20 shows casting part where the dope is cast on the casting support and numerical symbol 30 shows tenter drying part where the film stripped off from the casting support is dried while being conveyed by a tenter machine. Also in FIG. 1, numerical symbol 40 shows drying part where the film dried in tenter drying part 30 is further dried and numerical symbol 50 shows a take-up roller which winds up the film as a product. Dope preparation part 10 comprises a stirring tank 11 that stirs and mixes cellulose acetate, solvent, plasticizer, etc., and a filter 13 is connected thereto through a liquid supply pump 12 to the stirring tank 11. Casting part 20 comprises a casting die 21 and a rotating drum 22 as a casting support, and the dope is fed from the filter 13 to the casting die 21. It further comprises a stripping roller 23 to strip off the film from the rotating drum 22 and a conveyer roller 24 to convey the film to tenter drying part 30.

Tenter drying part 30 comprises a pin tenter 31, which dry the film by the use of drying wind while conveying the film carrying at both side edges of the film. Drying part 40 comprises many conveyer rollers 41, and drying part 40 dries the film by the use of drying wind while conveying the film with conveyer rollers 41. Casting part 20 further comprises condenser 25, an air-supply fan 26, a heater 27 and a filter 28 wherein the solvent is recovered gas in casting part 20 by the condenser 25, and then recycled to casting part 20 through the heater 27 and the filter 28 by the use of the air-supply fan 26. Similarly as casting part 20, tenter drying part 30 comprises a condenser 32, an air-supply fan 33, a heater 34 and a filter 35 wherein the solvent is recovered in tenter drying part 30 by the condenser 32 and then recycled to tenter drying part 30 through the heater 34 and the filter 35 by the use of the air-supply fan 33. Drying part 40 comprises an air-supply fan 42, a heater 43, a filter 44, and adsorption recovering apparatus 46 to adsorb solvent from the gas exhausted from the filter 45 and the air-supply fan 42 to introduce fresh wind toward the air-supply fan 42. Fresh wind is fed to drying part 40 through the heater 43 and the filter 44 along with the gas recovered by the air-supply fan 42 and the adsorption recovering apparatus 46 recovers solvent from the collected gas.

Figure 2:
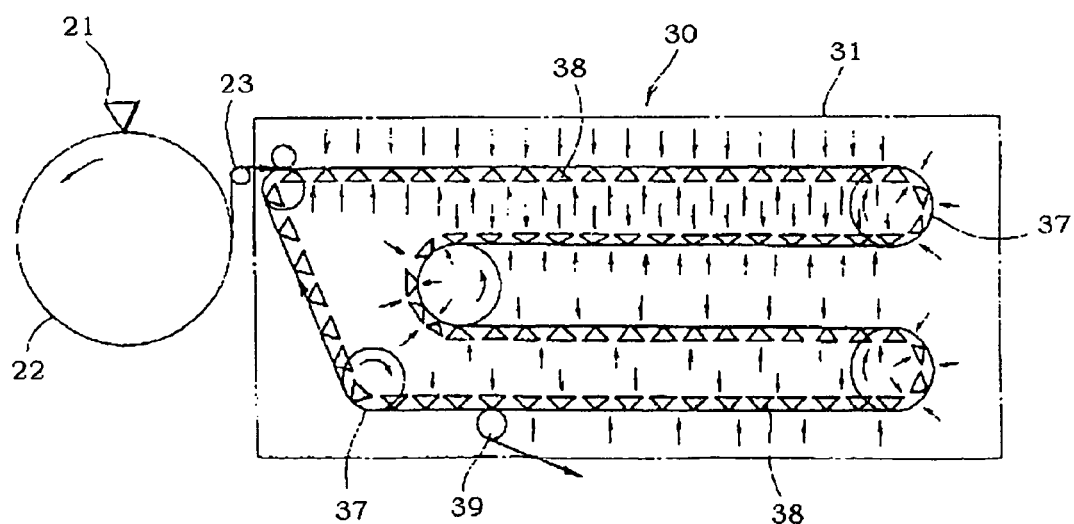
FIG. 2 shows a schematic illustration of the main part of a solvent casting apparatus for carrying out the process of the invention.

FIG. 2 is a schematic illustration of the main part of a solvent casting apparatus and numerical symbol 21 shows a casting die, numerical symbol 22 shows a rotating drum as a casting support on which a dope cast from casting die 21, and numerical symbol 30 shows tenter drying part where the film stripped off from the casting support 22 is dried while being conveyed by a tenter machine. Adjacent to the casting support 22, a stripping roller 23 to strip oil the film from the casting support 22 is provided. Tenter-drying part 30 further comprises conveying rollers 37 installed inside a drier housing 36, a tenter machine 38 between conveying rollers 37 and a separation roller 39 at the end of it.

In order to produce a film by the solvent casting apparatus, a dope (cellulose acetate solution) is prepared in a dissolver (tank) and is stored in a storage tank for a short time to defoam the dope or to adjust the dope finally. The dope is fed from a dope outlet slot to the casting die 21 through a compression type gear pump capable of constant quantity feed with high precision by controlling the number of revolutions, and the dope is cast uniformly on the casting drum 22 moving endlessly. Then, at the point of stripping where the drum 22 nearly goes around, the wet film of dope (described merely as film below) is stripped off from the drum 22 by means of it stripping roller 23. Film 50 stripped off is fixed at both side edges with the tenter machine 38, dried while being conveyed among the conveying rollers 37 and is separated from the tenter machine 38 by means of the separation roller 39. Film 50 separated is further dried if necessary, conveyed to take-up process and wound up to take-up roller.

The present invention shall be explained below in further details with reference to examples, but the present invention shall by no means be restricted by the following examples.

EXAMPLES

Example 1

Dope A

Cellulose triacetate (raw material: pulp) . . . 16 mass %
  (Acetylation degree: 60.9%, degree of polymerization: 305, substitution rates with acetyl group at 6-position: 0.75, average particle diameter: 1.5 mm)
Cellulose triacetate (raw material: pulp) . . . 2 mass %
  (Acetylation degree: 61.2%, degree of polymerization: 322, substitution rates with acetyl group at 6-position: 0.72, average particle diameter: 1.1 mm)
Cellulose triacetate (raw material: linter) . . . 2 mass %
  (Acetylation degree: 61.2%, degree of polymerization: 362, substitution rates with acetyl group at 6-position: 0.72, average particle diameter: 1.3 mm)
Triphenylphosphate . . . 2 mass %
Biphenyldiphenylphosphate . . . 1 mass %
Benzotriazole UV absorber . . . 0.2 mass %
Silicon oxide matte agent
  (Primary particle 20 nm) . . . 0.1 mass %
Methylene chloride . . . 67 mass %
Methanol . . . 9 mass %
n-butanol . . . 1 mass %

Dope A was prepared by dissolving and filtering the polymer solution with the foregoing composition using the high-temperature dissolution process described in Journal of Technical Disclosure 2001-1745.

Dope B

Dope B was prepared by blending the following materials with the composition of Dope A and diluting till the solid matter concentration became 18.5 mass %.
Silicon oxide matte agent
  (Primary particle 20 nm) . . . 0.1 mass %
Stripping accelerator . . . 0.1 mass %
  (Compounds disclosed in Example 6 of Japanese Patent Application No. 63-129747)

The polymer solution having the above composition was dissolved and filtered according to the high-temperature dissolution process described in Journal of Technical Disclosure 2001-1745 to prepare dope B.

Manufacture of Film

The casting die used was a multi-manifold coat hanger type die, and the casting support was a rotation drum having a diameter of 2000 mm and a width of 2500 mm plated with hand chrome, followed by mirror finishing so that the center line average height became 0.03 µm. The rotation drum was kept at an average surface temperature of −5° C. by flowing coolant inside the drum, and the temperature distribution on the surface of the drum was 2° C. or less.

Then, Dope A and Dope B were coextruded in the way that Dope A formed a core layer of thickness 70 µm after drying and Dope B formed outer layers on both surfaces there of having thickness of 5 µm after drying, respectively. Both Dope A and Dope B discharged from the casting die was kept under reduced pressure conditions by installing a back suction chamber in a primary side of a bead, in order not to be excessively extended in the casting direction. Rotating peripheral-speed of the drum was 30 m/minute, and the inside pressure of the back suction chamber was reduced made lower than the ambient pressure by 400 Pa. The pressure fluctuation inside the back suction chamber was regulated by installing a side branch of 1500 mm length in pipeline connecting to the chamber. In this time, the peak value of the pressure fluctuation inside the chamber in characteristic frequency obtained by digital fast Fourier transformation was always 5 Pa or less in the frequency range of 10-100 Hz, and was 50% or less of the peak value under the condition without the side branch.

The cast dopes A and B were dried by blowing drying wind at a velocity of 0.5 m/s or less for one second just after casting, and then further dried at a drying wind velocity of 15 m/s by the drying wind against the traveling direction of the casting drum. The temperature of the drying wind was 50° C. The solvent in the drying wind was condensed and recovered by a condenser so that the dew-point of the solvent became −30° C. Recovered solvent was dehydrated by using zeolite, and was recycled to the preparation process. Drying wind was circulated after being filtered by a high performance air filter having a collection efficiency of 99.999% on 0.3 µm. Cleanliness of gas in a drying zone was class 5 or less and M3.5 or less according to the class of FED-STD-209E. Furthermore, the oxygen concentration in the drying zone was maintained at 5 vol. % by using nitrogen gas. The nitrogen gas was supplied from a pressure swing type isolation apparatus or a liquid nitrogen tank.

The residual solvent quantity in the film was 230 mass % just at stripped off from the rotation drum, and the temperature of the film was −6° C. The mean drying rate was 744 mass %/minute between the casting and stripping off from the casting drum. Moreover, the gelation temperature of the dope at stripped off was about 10° c. The stripping off from the drum was conducted stably. The film stripped off was conveyed to the pin tenter machine over pass rollers adjusted to the surface temperature of −5° C. by flowing a coolant inside the roller, and, was further conveyed and dried, while being held with a tension at the area of both side edge portion (thickness: 70 µm) in width direction by the pin tenter. The number of the pass rollers used after the stripping off was three, and they were all disposed in the state of being wrapped by the anti-support surface of the film. It was able to settle The draw ratio by these pass rollers can be set in the range from 0.5% to 15% against the rotation speed of the casting drum, and they were driven with the draw ratio of 1%, 2%, 4% respectively against each drum. They were disposed so that the wrapping angle became 5 degrees or less. The distance between the stripping off and the starting point of the pin tenter machine was 1.2 m.

On being carried by the pin tenter, the temperature of the pin tenter was 25° C. and the temperature of the film was 5° C. Most of the residual solvents in the film was methylene chloride. The saturation temperature of the gas in the drying zone was −15° C., and the oxygen concentration was 6%. The evaporated solvent was condensed and recovered in the same way as the casting part, and the inside of the drying zone was inert by the presence of nitrogen gas. Further, a high performance air filter having a collection efficiency of 99.999% on 0.3 μm was installed in the circulating path of the drying wind. Cleanliness of the gas in the drying zone was class 5 or less and M3.5 or less according to the class of FED STD-209E.

The temperature of the drying wind was 120° C., and the temperature distribution in the width direction of the film at this time was 5° C. or less. The mean wind velocity of the drying wind was 5 m/second, the mean coefficient of heat transfer was 25 kcal/m$^2$·hr·° C., and the distribution of then in the cross direction of the film was within 5%, respectively. Furthermore, the area of the film held by the pin tenter was protected from direct blowing of hot air in the drying zone by installing a wind-shielding device. The film conveyed by the pin tenter machine was dried while keeping tension in the width direction at 98 N/m (10 kg/m) so that the flatness of the film wax maintained. Moreover, the pin tenter was cooled by blowing cooling air at −5° C. at an overall coefficient of heat transfer of 150 kcal/m$^2$·hr·° C., between from the detaching of the film to the start of carrying the film again. The length of the portion cooled by a cooling means was set to be 50% of the total length of the apparatus.

The time that the film was dried while being carried by the pin tenter was 10 minutes, and the quantity of solvent evaporated in the meantime was 97% of total quantity of the solvent evaporated between stripped off and wound to a take-up device. The evaporated solvent was condensed and recovered by a condenser, and the recovered solvent was dehydrated to the water content of 0.4% by distillation, and then, used again as the raw material for preparation process of the dope.

The film dried by the pin tenter was further dried by the drying wind at 145° C. for 15 minutes in the drying zone where the film was conveyed over rollers. Then, the film was wound up having a residual solvent quantity 0.55 mass %, moisture content 0.8 mass %, and temperature 35° C. by adjusting temperature and humidity. Conveying tension in the drying zone was; 65-150 N/m, and the magnitude of a charging quantity of the film was kept at 3 kV or less. Solvent gas concentration in the drying zone was not higher than 20% of the lower explosion limit of the solvent, and the dew-point of high boiling point component other than the solvent was 80° C. or higher. The drying wind was supplied after passing an air filter having a collection efficiency of 99.97% on 0.3 μm. Cleanliness of the drying wind was ISO class 5 or less and M3.5 or less according to the class of FED-STD-209E.

The film produced by the foregoing method was stably conveyed in the drying process after being stripped off from the casting die, without any problem such as wrinkles or deviation. Moreover, the flatness and clarity of the film wound up were excellent, and the number of the foreign matter of 10 μm or more was 0 per 1 cm$^2$.

Comparative Example 1

The dopes were cast and dried under the same condition as Example 1 with the exception that the thickness of the core layer being made 35 μm after drying, the thickness of both of the outer layers being made 2.5 μm after drying respectively, the mean wind velocity of the drying wind being made 25 m/minute, and the temperature of the drying wind being made 60° C. on the rotating drum.

As a result, the mean drying rate from being cast to being stripped off reached 1050 mass %/minute, but the flatness of the film degraded remarkably caused by uneven blowing of the drying wind on the casting surface.

Comparative Example 2

The dopes were cast and dried under the same conditions as Example 1 with the exception that the dew-point of solvent in the drying wind being made −7° C., the mean wind velocity of the drying wind being made 2.5 m/minute, and the temperature of the drying wind being made 20° C. on the rotating drum.

As a result, the quantity of residual solvent in the dope at stripped off was 310 mass %, and the mean drying rate from being cast to being stripped off was 220 mass %/minute, but stable stripping off could not be conducted at the casting velocity of 30 m/minute. It was necessary to decrease the casting velocity to 10 m/minute in order to conduct stable stripping off under the foregoing mean drying rate, and accordingly, productivity fell remarkably.

Example 2

Dope C
Cellulose triacetate (raw material: pulp) . . . 20 mass %
  (Acetylation degree: 60.9%, degree of polymerization: 305, substitution ratio with acetyl group at 6 position: 0.85, average particle diameter 1.5 mm)
Triphenylphosphate . . . 2 mass %
Biphenyldiphenylphosphate . . . 1 mass %
Benzotriazole UV absorber . . . 0.2 mass %
Methylene chloride . . . 61 mass %
Methanol . . . 16 mass %

Dope C wars prepared by dissolving and filtering the polymer solution with the foregoing composition using the high-temperature dissolution process described in Journal of Technical Disclosure 2001-1745.

Dope D
Dope D was prepared by blending the following substances with the composition of Dope C and diluting till the solid matter concentration became 18.5 mass %.
Silicon oxide matte agent
  (Primary particle 20 nm) . . . 0.1 mass %
Stripping accelerator . . . 0.1 mass %
  (Compounds disclosed in Example 6 of Japanese Patent Application No. 63-129747)

The polymer solution having the above composition was dissolved and filtered according to the high-temperature dissolution process described in Journal of Technical Disclosure 2001-1745 to prepare dope D.

Manufacture of Film

Using a coat hanger type die equipped with a feed block, the dopes were coextruded in the way that Dope C formed a core layer of thickness 70 μm after drying and Dope D formed outer layers of thickness 5 μm each after drying on both surfaces of the core layer. Other conditions such as casting and drying conditions were the same as Example 1. Residual solvent quantity at the time of being striped off was 245 mass %, and the temperature of the film was −5° C. The mean drying rate between the casting and stripping off from the casting drum was 657 mass %/minute. The gelation temperature of the dope at the time of being stripped off was 15° C. The film produced by the foregoing method was stably conveyed in the drying process after being stripped off from the casting die, without any problem such as winkles or deviation. Moreover, the flatness and clarity of the film wound up were excellent, and the number of the foreign matter of 10 μm or more was 0 per 1 cm².

Comparative Example 3

The dopes were cast and dried under the same condition as Example 2 with the exception that the temperature of the drying wind was 100° C. The mean drying rate from being cast to being stripped off reached 1150 mass %/minute, but stable stripping off was unable caused by the occurrence of foaming on the casting surface of the dope.

Comparative Example 4

The dopes were cast aid dried under the same condition an Example 2 with the exception that the surface temperature of the conveying rollers were 14.5° C. after the stripping off. The film stripped off from the casting support could not be conveyed by the adhesion to the conveying rollers.

Preparation and Evaluation of Polarizing Plate

The polarizing plate sample was prepared by providing a polarizer which was a stretched polyvinyl alcohol film onto which iodine was adsorbed, and adhering the cellulose triacetate film prepared in Example 1 or 2 to both surfaces of the polarizer by using polyvinyl alcohol based adhesive. The polarizing plate sample was revealed in the atmosphere of 90% RH at 60° C., for 500 hours. Degrees of polarization were 99.6% or more in all Examples, and enough durability was recognized.

Parallel transmittance (Yp) and orthogonal transmittance (Ye) in visible area of the polarizing plate were measured by spectrophotometer, and the degree of polarization P was determined by the following formula.

$$P=\sqrt{((Y_p-Y_c)/(Y_p+Y_e))}$$

Example 3

Preparation of Optically Functional Film

Onto one surface of the triacetylcellulose film [thickness: 100 μm, {(nx+ny)/2−nz}×d=70 nm] prepared in Example 1, a gelatin layer (layer thickness: 0.1 μm) was applied. Subsequently, a coating solution of long-chain alkyl-modified polyvinyl alcohol ("MP-203", Kuraray Co., Ltd.) was applied onto the gelatin layer and dried for 30 seconds by warm wind at 110° C., followed by rubbing the coated film to form an oriented film. On the surface of the oriented film, a discotheque liquid crystal was applied. In details, a coating solution containing 20 mass % of the compound TE-8 (m=4) described in JP 8-43625A, and 0.1 mass % of photoinitiator (Ilgacure 907, produced by Ciba Geigy Japan Co., Ltd.) in methyl ethyl ketone was applied by a slide coater at a coating velocity of 20 m/minute, with a coating amount of 12 cc/m², to form the discotheque liquid crystal layer with a thickness of 2.4 μm. The discotheque liquid crystal was further oriented by placing the film composed of the orientated film and liquid crystal layer in a constant temperature bath set to be at 150° C. for five minutes, and matured. Then, mercury lamp (400 watt) was irradiated to the film at 150° C. for two minutes, and left to cool to room temperature, to obtain an optical compensation sheet.

Figure 3:
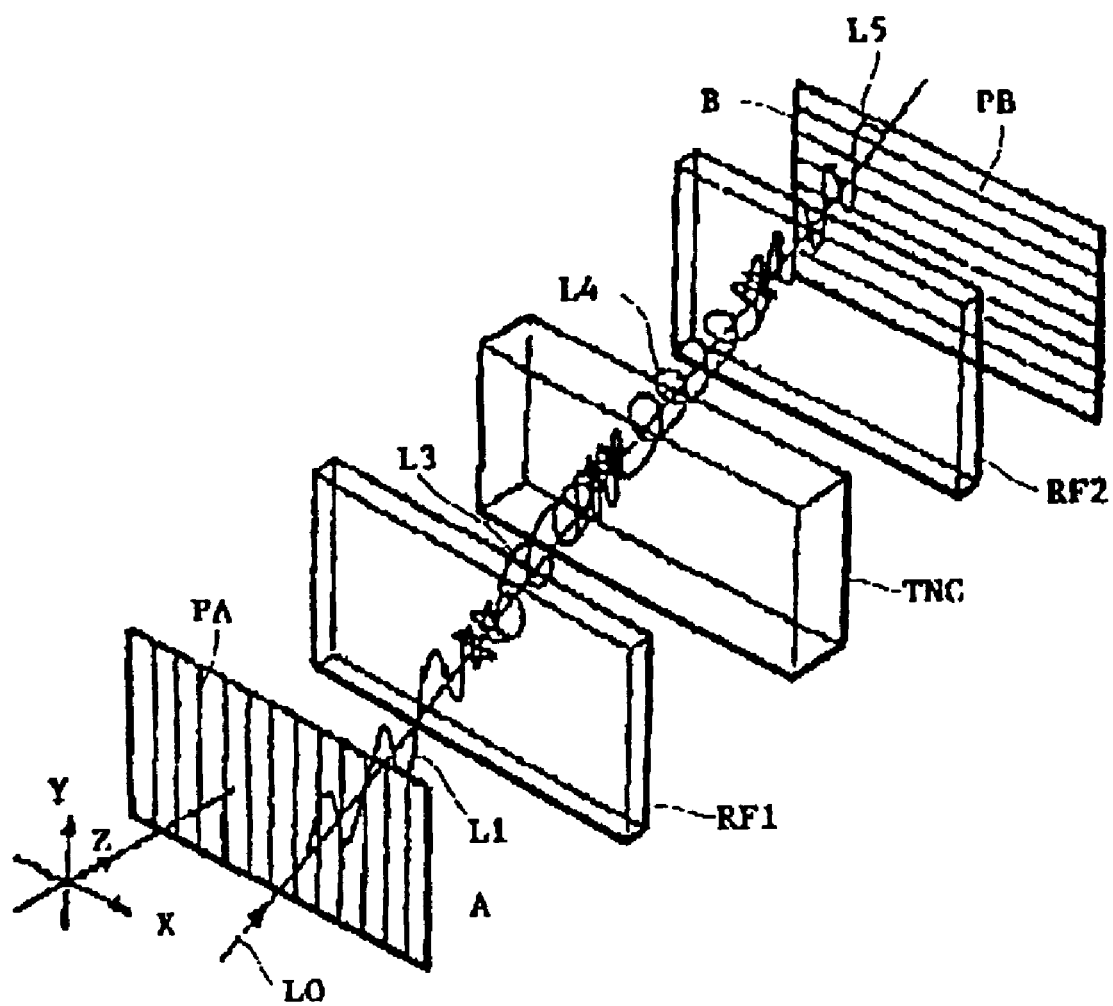
FIG. 3 shows an exploded perspective view of a liquid crystal display device using a film produced by the process for solvent casting of the invention.

The optical compensation sheet thus prepared was assembled in TN type liquid crystal cell as shown in FIG. 3, and the improvement in a viewing angle was found without reducing contrast. In FIG. 3, the TN type liquid crystal cell is designated by TNC, the optical compensation sheets are designated by RF1 and RF2, the polarizing plates are designated by A and B, polarizing axes are designated by PA and PB, L0 designate natural light, L1 and L5 designate linearly polarized light, and L3 and L4 designate elliptical polarization.

Example 4

Dope E
Cellulose triacetate (raw material: pulp) . . . 16 mass %
   (Acetylation degree: 60.9%, degree of polymerization: 305, substitution ratio with acetyl group at 6-position: 0.75, average particle diameter: 1.5 mm)
Cellulose triacetate (raw material: pulp) . . . 2 mass %
   (Acetylation degree: 61.2%, degree of polymerization: 322, substitution ratio with acetyl group at 6-position: 0.72, average particle diameter: 1.1 mm)
Cellulose triacetate (raw material: linter) . . . 2 mass %
   (Acetylation degree: 61.2%, degree of polymerization: 362, substitution ratio with acetyl group at 6-position: 0.72, average particle diameter: 1.3 mm)
Triphenylphosphate . . . 2 mass %
Biphenyldiphenylphosphate . . . 1 mass %
Benzotriazole system UV absorber . . . 0.2 mass %
Silicon oxide matte agent
   (Primary particle 20 nm) . . . 0.1 mass %
Methylene chloride . . . 67 mass %
Methanol . . . 9 mass %
n-butanol . . . 1 mass %
Stripping accelerator . . . 1 mass %
   (Compound described in Example 6 of Japanese Patent Application No. 63-129747)
Dope F
Dope F was prepared by diluting Dope E to a solid matter concentration of 18.5 mass %.

Preparation of Casting Dope

Dope E and Dope F were prepared by dissolving the polymer solution of the foregoing composition and filtering by the high-temperature dissolution process described in Journal of Technical Disclosure 2001-1745.

Manufacture of Film

The casting die used was a coat hanger type die, and the casting support was a rotating drum with 4000 mm in diameter and 3800 mm in with plated with hard chrome, followed by mirror finishing to obtain a center line average height of 0.03 μm, and was kept the surface temperature at −10° C.

The dope was cast from the coat hanger type die onto the rotating drum with the width of 1600 mm in the conditions that the dry thickness of product portion became 40 μm and that the dry thickness of side edge portions carried by a pin tenter became 50 μm. Then, the dope was stripped off from the drum under the condition of containing 250 mass % of volatile component, and was carried by the pin tenter at both side edges. At that time, the temperature of the pin tenter was 25° C., and the temperature of the film was 5° C., and most of residual solvents in the film was methylene chloride. The saturation temperature of atmospheric gas in the area that the film began to be carried by the pin tenter was −20° C., and oxygen concentration was 6%. The film carried by the pin tenter was introduced into a drying zone, dried by hot air while being conveyed in the drying zone. The temperature of the drying wind was 120° C., and the temperature distribution in the width direction of the film at this time was 5° C. or less. The mean wind velocity of the drying wind was 5 m/second, the mean coefficient of heat transfer was 25 kcal/m²·Hr·° C., and the distribution of them in the cross direction of the film was within 5%, respectively.

Furthermore, the area of the film held by the pin tenter was protected from direct blowing of hot air in the drying zone by installing a wind-shielding device. The film conveyed by the pin tenter machine was dried while keeping tension in the width direction at 98 N/m (10 kg/m) so that the flatness of the film was maintained. Moreover, the pin tenter was cooled by cooling air at −5° C. at an overall coefficient of heat transfer of 150 kcal/m²·hr·° C., between from the detaching of the film to the start of carrying the film again. The length of the portion cooled by a cooling means was set to be 50% of the total length of the apparatus.

The time that the film was dried while being carried by the pin tenter was 10 minutes, and the quantity of solvent evaporated in the meantime was 97% of total quantity of the solvent evaporated between stripped off and wound to a take-up device. The evaporated solvent was condensed and recovered by a condenser, and the recovered solvent was dehydrated to the water content of 0.4% by distillation, and then, used again as the raw material for preparation process of the dope.

Comparative Example 5

The dopes were cast and dried under the same conditions as Example 4 with the exception that the mean thickness and the thickness of the film in the area of being carried by the pin tenter was 30 μm.

Example 5

Dope E' was the same as Dope E except that matte agent was removed from Dope E in Example 4, and Dope F was the same as Dope F in Example 4. Using a multi-manifold type die, the dopes were simultaneously cast on the casting support in the same why as Example 4, while Dope E' formed the core part corresponding to the thickness of 70 μm after drying, and Dope F formed outer layers on both surfaces of the core part corresponding to the thickness of 5 μm after drying. Then, the film stripped off from the casting support was carried by the pin tenter machine with the conditions of residual solvent of 280 mass % and a temperature −2° C. The other conditions for casting and drying the film were the same as Example 4.

Comparative Example 6

The dopes were cast and dried under the same condition as Example 5 with the exception that the cooling wind was stopped. The temperature that the pin tenter began to carry the film was 45° C.

Example 6

Preparation of Dope G

The solution was prepared by adding cellulose triacetate powder (men size: 2 mm) gradually to the following solvent mixture cooled to 15° C. with stirring well in a dissolution tank made of stainless steel having an agitating blade. After the addition, the cellulose triacetate was swollen by being held at 30° C. for three hours. All solvents employed, i.e. methyl acetate, acetone, methanol and ethanol were with a water content of not more than 0.2 mass %.

Cellulose triacetate . . . 18 mass part
  (Substitution degree: 2.83, acylated rat at 6-position: 0.88, viscosity average polymerization degree: 320, stock cotton pulp: stock cotton linter=3:7 (by mass), water content: 0.4 mass %, viscosity of 6 mass % in methylene chloride solution 305 nPA)
Methyl acetate . . . 54.3 mass part
Acetone . . . 10 mass part
Methanol . . . 5 mass part
Ethanol . . . 10 mass part
Plasticizer A . . . 2 mass part
  (Dipentaerythritol hexaacetate)
Plasticizer B . . . 1.7 mass part
  (Triphenylphosphate)
Fine particles (silica particle size 20 nm) . . . 0.1 mass part
UV agent A . . . 0.1 mass part
  (2,4-bis-(n-octyl thio)-6-(4-hydroxy-3,5-di-tert-butyl anilino)-1,3,5-triazine)
UV agent B . . . 0.1 mass part
  (2(2'-hydroxy-3',5'-di-tert-bytyl phenyl)-5-chloro benzotriazol)
UV agent C . . . 0.1 mass part
  (2(2'-hydroxy-3',5'-di-TerT-amyl phenyl)-5-chloro benzotriazol)
$C_{12}H_{25}OCH_2CH_2O—P(=O)—(OK)_2$ . . . 0.05 mass part
Citric acid ester . . . 0.02 mass part Cooling dissolution of Dope G (Cellulose Triacetate Solution)

Feeding the cellulose triacetate solution by a screw extruder equipped with a jacket inside of which a coolant flew, the solution was passed the cooling portion for a period of 10 minutes at −80° C. The cooling was executed by the use of coolant cooled to −90° C. by a refrigerating machine. Then, the solution obtained by the cooling wads transferred to a container made of stainless steel, and stirred at 50° C. for two hours. Subsequently, the solution was filtered by passing a filter paper having an absolute filtration accuracy of 0.01 mm (#63 produced by Toyo filter paper Co., Ltd.,).

Preparation of Cellulose Acetate Film

The casting support used was a stainless belt of 1800 mm in width, 56 m in length, and 1.5 mm in thickness with the surface plated with hard chrome, followed by mirror finishing to obtain a center line average height of 0.03 μm and Dope G was cast from the first casting outlet above the driving drum for the heat in the way that the casting width became 1650 mm. The temperature of the belt in the first casting part was set at 25° C. Further, Dope G was successively cast in superposing relation in a width of 1700 mm from the second casting outlet installed 25 m away from the first casting outlet. The temperature of the belt in the second casting part was set at 27° C. Each casting thickness was 40 μm after drying, and the total dry thickness was 80 μm.

After drying to solidify the dope to some extent on the belt, the dope was stripped off from the belt, when residual volatile component reached 120%. Then, a pin tenter machine carried the side edge portions of the film stripped off. The temperature of the pin tenter at this time was 35° C., the temperature of the film carried was 10° C., and the thickness of the film was 100 μm. Most of residual solvents in the film was methyl acetate. The saturation temperature of atmospheric gas in the area that film began to be carried by the pin tenter was −20° C., and oxygen concentration was 6%. The film carried by the pin tenter was introduced into a drying zone, and dried by hot air while being conveyed in the drying zone. The temperature of the drying wind was 140° C., and the temperature distribution in the width direction of the film at this time was 8° C. or less. The mean wind velocity of the drying wind was 5 m/second, the mean coefficient of heat transfer was 25 kcal/m²·hr·° C., and the distribution of them in the cross direction of the film was within 5% respectively.

Furthermore, the area of the film held by the pin tenter was protected from direct blowing of drying wind in the drying zone by installing a wind-shielding device. The tension in the width direction of the film being conveyed by the pin tenter was kept at 5 kg/m in order to maintain flatness of the film excellent.

Moreover, the pin tenter was cooled by cooling air at 0° C. at an overall coefficient of heat transfer of 150 kcal/m²·hr·° C., between from the detaching of the film to the start of carrying the film again. The length of the portion cooled by a cooling means was set to be 50% of the total length of the apparatus. The time that the film was dried while being carried by the pin tenter was 10 minutes, and the quantity of solvent evaporated in the meantime was 93% of total quantity of the solvent evaporated between tripped off and wound to a take-up device. The evaporated solvent was condensed and recovered by a condenser, and the recovered solvent was dehydrated to the water content of 0.2% by distillation, and then, used again as raw the material for preparation process of the dope.

Example 7

The dopes were cast and dried under the same conditions as Example 6 with the exception that the mean thickness of the film was 135 μm, the residual solvent quantity of the film on stripped off from the belt being the casting support was 150%, the temperature and the thickness of the film in the area of being carried by the pin tenter was respectively 12° C. and 200 μm and the residual solvent quantity was 220%.

Comparative Example 7

The dopes were cast and dried under the same conditions as Example 6 with the exception that the temperature and the thickness of the film in the area of being carried by the pin tenter was respectively 10° C. and 450 μm and the residual solvent quantity was 250%.

Example 8

The casting support was a stainless belt of 1800 mm in width, 56 m in length and 1.5 mm in thickness with the surface plated with hard chrome, followed by mirror finishing to obtain a center line average height of 0.02 μm, and Dope E was cast from the first casting outlet above the driving drum for the belt in the way that the casting width became 1650 mm. The temperature of the belt in the first casting part was set at 20° C. Further, Dope G was successively cast in superposing relation in a width of 1700 mm from the second casting outlet installed 25 m away from the first casting outlet. The temperature of the belt in the second casting part was set at 27° C. Each casting thickness was 40 μm after drying, and the total dry thickness was 80 μm.

After drying to solidify Dope E to some extent on the belt, the dope was stripped off from the belt, when residual volatile component reached 100%. Then, a clip tenter machine carried the side edge portions of the film stripped off. The temperature of the clip tenter at this time was 25° C., the temperature of the film carried was 20° C., and the thickness of the film was 120 μm. Most of the residual solvents in the film was dichloromethane. The saturation temperature of atmospheric gas in the area that film began to be carried by the clip tenter was −10° C., and oxygen concentration was 6%. The film carried by the clip tenter was introduced into a drying zone, and dried by hot air while being conveyed in the drying zone. The temperature of the drying wind was 120° C., and the temperature distribution in the width direction of the film at this time was 6° C. or less. The mean wind velocity of the drying wind was 5 m/second, the mean coefficient of heat transfer was 25 kcal/m²·hr·° C., and the distribution of them in the cross direction of the film was within 5%, respectively.

Furthermore, the area of the film held by the clip tenter was protected from direct blowing of drying wind in the drying zone by installing a wind-shielding device. The tension in the width direction of the film being conveyed by the clip tenter was kept at 196 N/m (20 kg/m) in order to maintain flatness of the film excellent.

Moreover, the clip tenter was cooled by cooling air at −5° C. at an overall coefficient of heat transfer of 120 kcal/m²·hr·° C., between from the detaching of the film to the start of carrying the film again. The length of the portion cooled by a cooling means was set to be 50% of the total length of the apparatus.

The time that the film was dried while being carried by the clip tenter was 5 minutes, and the quantity of solvent evaporated in the meantime was 93% of total quantity of the solvent evaporated between stripped off and wound to a take-up device. The evaporated solvent was condensed and recovered by a condenser, and the recovered solvent was dehydrated to the water content of 0.2% by distillation, and then, used again as the raw material for preparation process of the dope.

Example 9

The casting support was a stainless belt of 1800 mm in width, 56 m in length and 1.5 mm in thickness with the surface plated with hard chrome followed by mirror finishing to obtain a center line average height of 0.02 μm, and Dope G was cast from the first casting outlet above the driving drum for the belt in the way that the casting width become 1650 mm. The temperature of the belt in the first casting part was set at 25° C. Further, Dope G was successively cast in superposing relation in a width of 1700 mm from the second casting outlet installed 25 m away from the first casting outlet. The temperature of the belt in the second casting part was set at 27° C. Each casting thickness was 40 μm after drying, and the total dry thickness was 80 μm.

After drying to solidify the dope to some extent on the belt, the dope was stripped off from the belt, when of residual volatile component reached 120%. Then a clip tenter machine carried the side edge portions of the film stripped off. The temperature of the clip tenter at this time was 35° C., the temperature of the film carried was 20° C., and the thickness of the film was 100 μm. Most of the residual solvents in the film was methyl acetate. The saturation temperature of atmospheric gas in the area that film began to be carried by the clip tenter was −5° C., and oxygen concentration was 6%. The film carried by the clip tenter was introduced into a drying zone, and dried by hot air while being conveyed in the drying zone. The temperature of the drying wind was 140° C., and the temperature distribution in the width direction of the film at this time was 8° C. or less. The meal wind velocity of the drying wind was 5 m/second, the mean coefficient of heat transfer was 25 kcal/m²·hr·° C., and the distribution of them in the cross direction of the film was within 5%, respectively.

Furthermore, the area of the film held by the clip tenter was protected from direct blowing of drying wind in the drying zone by installing a wind-shielding device. The tension in the width direction of the film being conveyed by the clip tenter was kept at 20 kg/m in order to maintain flatness of the film excellent. Moreover, the clip tenter was cooled by cooling air at 0° C. at an overall coefficient oft heal transfer of 150 kcal/m²·hr·° C., between from the detaching of the film to the start of carrying the film again. The length of the portion cooled by a cooling means was set to be 50% of the total length of the apparatus.

The time that the film was dried while being carried by the clip tenter was 5 minutes, and the quantity of solvent evaporated in the meantime was 93% of total quantity of the solvent evaporated between stripped off and wound to the take-up device. The evaporated solvent was condensed and recovered by a condenser, and the recovered solvent was dehydrated to the water content of 0.2% by distillation, and then, used again as the raw material for preparation process of the dope.

Comparative Example 8

The dopes were cast and dried under the same conditions as Example 8 with the exception that the tension of the stretching by the clip tenter was set to 300 kg/m.

Comparative Example 9

The dopes were cast and dried under the same conditions as Example 9 with the exception that the cooling air of the clip tenter was stopped. The temperature of the clip on carrying the film was 60° C.

Evaluation of Casting Stability

In Examples 4-7, the film was stably dried without any trouble such as foaming in the area carried by the pin tenter or breaking from penetrated holes by pin, and the film obtained was excellent in flatness.

In Comparative Example 5, due to thin thickness of the film in the area carried by the pin tenter, the film could not resist the contractive force caused by drying, and was torn from the holes by pin to be broke. In Comparative Example 6, foaming in the film generated from pin holes, and the film was torn on being detached from the pin, resulting in breaking. In Comparative Example 7, due to thick thickness of the film in the area carried by the pin tenter, undried dope adhered to the pins on detaching from the pins, and the film was broken by the, detaching trouble.

In Examples 8 and 9, the film was stably dried without any trouble such as foaming in the area carried by the clip tenter or breaking from holes by pin, and the film obtained was excellent in flatness.

In Comparative Example 8, the film was broken during stretched by the tenter, and enabled to convey. In Comparative Example 9, foaming generated during conveying by the tenter, which partially extended to the product portion, and the film was fallen in the level of failure as the product.

Preparation and Evaluation of Polarizing Plate

The polarizing plate sample was prepared by providing a polarizer which was a stretched polyvinyl alcohol film onto which iodine was absorbed, and adhering the cellulose triacetate film prepared in Examples 4 to 9 to both surfaces of the polarizer by using polyvinyl alcohol based adhesive. The polarizing plate sample was revealed in the atmosphere of 90% RH at 60° C., for 500 hours. Degrees of polarization were 99.6% or more in all Examples, and enough durability was recognized.

Parallel transmittance (Yp) and orthogonal transmittance (Yc) in visible area of the polarizing plate were measured by spectrophotometer, and the degree of polarization P was determined by the following formula.

$$P=\sqrt{((Yp-Yc)/(Yp+Yc))}$$

Example 10

Preparation of Optical Compensation Sheet

Onto one surface of the triacetylcellulose film [thickness: 100 µm, {(nx+ny)/2−nz}×d=70 nm] prepared in Example 6, a gelatin layer (layer thickness: 0.1 µm) was applied. Subsequently, a coating solution of long-chain alkyl-modified polyvinyl alcohol ("MP-203"produced by Kuraray Co., Ltd.) was applied onto the gelatin layer and (tried for 30 seconds by warm wind at 110° C., followed by rubbing the coated film to form an oriented film. A coating solution containing 20 mass % of the compound TE-8 (m=4) described in JP 8-43625A and 0.1 mass % of photoinitiator (Ilgacure 907, produced by Ciba Geigy Japan Co., Ltd.) in methylethyl ketone was applied by a slide coater at a coating velocity of 20 m/minute, with a coating amount of 12 cc/m², to form the discotheque liquid crystal layer with a thickness of 2.4 µm. The discotheque liquid crystal was further oriented by placing the film composed of the orientated film and liquid crystal layer in a constant temperature bath set to be at 150° C. for five minutes, and matured. Then, mercury lamp (400 watt) was irradiated to the film at 150° C.; for two minutes, and left to cool to room temperature, to obtain an optical compensation sheet.

The optical compensation sheet thus prepared was assembled in TN type liquid crystal cell as shown in FIG. 3, and the improvement in a viewing angle was found without reducing contrast. In FIG. 3, the TN type liquid crystal cell is designated by TNC, the optical compensation sheets are designated by RF1 and RF2, the polarizing plates are designated by A and B, polarizing axes are designated by PA and PB, L0 designate natural light, L1 and L5 designate linearly polarized light, and L3 and L4 designate elliptic polarization.

Example 11

In Example 4, the portion carried by the tenter of the film was slit by a rotary cutter continuously cut after 10 seconds from detached from the pin tenter, fed to a crusher by pneumatic conveying and crushed to chips. The residual solvent quantity of the film in the area carried by the tenter was 5 mass %, when it was cut.

Comparative Example 10

In Example 11, without cutting the area carried by the pin tenter from the film detached from the tenter, the film was passed the drying zone with rollers set the drying temperature at 130° C. Then, wrinkles generated after 4 minutes from the start of the conveying, and the conveying of the film became impossible.

Example 12

In Example 4, a nylon rotating brush was employed for continuously pushing the film to the pin in order to engage the pin tenter with the film. The brush was used after cooled to 0° C. by cooling air. The gelation temperature of the film at this time was 10° C. Boiling point of the residual solvent was 40° C. and saturation temperature of atmospheric gas was −15° C. The film could be engaged by the tenter stably and the conveying of the film was stable without adhesion of the film to the brush.

Comparative Example 11

In Example 12, the brush was used after cooled to 10° C. by cooling air. The gelation temperature of the film at this time was 10° C. Boiling point of the residual solvent was 40° C., gas saturation temperature of atmospheric gas was 2° C. The film adhered to the brush on detaching from the brush, and engaging to the pin became unstable extremely. Moreover, the film adhered to the brush was scattered, and adhered to the product portion of the film.

According to the invention, the film call be obtained with good quality, in other words, highly clear, optically isotropic superior in mechanical hardness, in dimensional stability and in durability.

Also, according to the invention, the high speed dissolution film forming method is achieved enabling to produce the film having good quality with stable conveying and with stable drying especially while the conveying of the film by the tenter machine in the drying steps after stripping off from the casting support.

While there has been described what is at present considered to be the preferred embodiment of the invention, it will be understood that various modifications may be made therein, and it is intended to cover in the appended claims all such modifications as fall within the true spirit and scope of the invention.

The invention claimed is:

1. A process for solvent casting which comprises casting a dope from a casting die onto a casting support, drying the cast dope on the casting support to form a film, stripping off the film from the casting support, and further drying the film while conveying the film with carrying it at both side edges of the film by a tenter, wherein dry thickness (X μm) of the both side edges and mean dry thickness (T μm) of product portion of the film have following relationship:

in the case that the tenter is a pin tenter,
in the range of $T \leq 60$, $$40 \leq X \leq 200 \quad (1)$$

in the range of $60 < T \leq 120$, $$40 + (T-60) \times 0.2 \leq X \leq 300 \quad (2)$$

in the range of $120 < T$, $$52 + (T-120) \times 0.2 \leq X \leq 400 \quad (3):$$

in the case that the tenter is a clip tenter,
in the range of $T \leq 40$, $$5 \leq X \leq T+50 \quad (4)$$

in the range of $40 < T \leq 120$, $$20 \leq X \leq T+100 \quad (5)$$

in the range of $T > 120$, $$60 \leq X \leq T+200 \quad (6);$$

wherein the temperature of said tenter is lower than the boiling point of residual solvent in the film by 2-50° C.;
wherein said tenter is forced to be cooled by a cooling means; and
wherein the temperature of the film at both side edges carried by the tenter is lower than the boiling point of residual solvent by 2-50° C., but higher than dew-point of atmospheric gas by 2-50° C.

2. The process for solvent casting of claim 1, wherein the tenter is a pin tenter.

3. The process for solvent casting of claim 1, wherein the tenter is a clip tenter.

4. The process for solvent casting of claim 1, wherein a temperature elevation of the tenter is prevented by a drying wind shielding means.

5. The process for solvent casting of claim 1, wherein said temperature of the film at both side edges carried by the tenter is lower than gelation temperature of the film by 2-50°.

6. The process for solvent casting of claim 1, wherein the solvent evaporating from said film while being carried by said tenter is 50-99% of the solvent evaporating from the film between being stripped off from the casting support and being wound up after drying.

7. The process for solvent casting of claim 1, wherein an oxygen concentration in a drying zone using the tenter is rendered 10% by volume or less, and wherein when solvent gas generated in the drying zone is recovered by condensation, the water content of the recovered solvent is decreased to 2% by weight or less, and then reused as a part of raw material.

8. The process for solvent casting of claim 1, wherein tension in a width direction given to said film by the tenter is 1960 N/m (200 kg/m) or less.

9. The process for solvent casting of claim 1, wherein the temperature is distributed in the width direction of the product portion of the film and the temperature distribution is 10° C. or less, while both side edges are carried by the tenter.

10. The process for solvent casting of claim 1, wherein a drying wind is distributed on the film surface in the width direction of the product portion of the film and the drying wind velocity distribution is 10% or less, while both side edges are carried by the tenter.

11. The process for solvent casting of claim 1, wherein an overall coefficient of heat transfer to the film by a drying wind is 5-300 kcal/m²·hr·° C.

12. The process for solvent casting of claim 1, wherein an overall coefficient of heat transfer to the tenter cooled by the cooling means is 10-300 kcal/m²·hr·° C.

13. The process for solvent casting of claim 1, wherein said dope is a solution of a member selected from the group consisting of cellulose acylate, polycarbonate, aramid group polymers and norbornane group polymers.

14. The process for solvent casting of claim 1, wherein said dope contains at least 10% by weight or more of cellulose acylate, wherein substitution ratio A of acyl groups at 6-position and substitution ratio B of remaining acyl groups satisfies formula (7) and formula (8), $$A \geq 0.75 \quad (7)$$

$$25 \geq A+B \geq 30 \quad (8).$$

15. The process for solvent casting according to claim 14, wherein the solvent of the dope comprises 50-90 mass % of methyl acetate, 0-40 mass % of acetone and 5-40 mass % of alcohol.

16. The process for solvent casting according to claim 14, wherein the dope contains a plasticizer in an amount of from 0.1 mass % to 20 mass % of the cellulose acylate.

17. The process for solvent casting of claim 14, wherein said dope is cellulose acylate solution containing a fluorine-containing surfactant in an amount of from 0.002 mass % to 2 mass % of the cellulose acylate.

* * * * *